(12) United States Patent
Nawai et al.

(10) Patent No.: US 8,192,076 B2
(45) Date of Patent: Jun. 5, 2012

(54) THERMAL SENSOR, NON-CONTACT THERMOMETER DEVICE, AND NON-CONTACT TEMPERATURE MEASUREMENT METHOD

(75) Inventors: Shinichiro Nawai, Nagaokakyo (JP); Tadamasa Miura, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 23 days.

(21) Appl. No.: 13/050,235

(22) Filed: Mar. 17, 2011

(65) Prior Publication Data

US 2011/0164655 A1 Jul. 7, 2011

Related U.S. Application Data

(63) Continuation of application No. PCT/JP2009/067833, filed on Oct. 15, 2009.

(30) Foreign Application Priority Data

Oct. 15, 2008 (JP) .................................. 2008-265945
Jul. 31, 2009 (JP) .................................. 2009-179022

(51) Int. Cl.
*G01J 5/00* (2006.01)
(52) U.S. Cl. ........................................................ 374/121
(58) Field of Classification Search .................... 374/121
See application file for complete search history.

(56) References Cited

U.S. PATENT DOCUMENTS

| | | | | |
|---|---|---|---|---|
| 4,250,384 A | * | 2/1981 | Pulvari | 250/330 |
| 5,523,564 A | * | 6/1996 | Yamada et al. | 250/338.1 |
| 5,645,349 A | * | 7/1997 | Fraden | 374/120 |
| 6,133,572 A | * | 10/2000 | Cunningham | 250/339.03 |
| 6,362,723 B1 | * | 3/2002 | Kawase | 338/22 R |
| 6,565,254 B2 | * | 5/2003 | Sato et al. | 374/132 |
| 6,690,558 B1 | * | 2/2004 | Devoe et al. | 361/58 |
| 2004/0016110 A1 | * | 1/2004 | Kawase | 29/612 |
| 2008/0092628 A1 | * | 4/2008 | Oishi et al. | 73/25.01 |
| 2011/0164655 A1 | * | 7/2011 | Nawai et al. | 374/121 |
| 2011/0182320 A1 | * | 7/2011 | Noda | 374/121 |
| 2011/0197880 A1 | * | 8/2011 | Murthy et al. | 126/683 |

FOREIGN PATENT DOCUMENTS

| | | | |
|---|---|---|---|
| JP | 60-11042 | | 1/1985 |
| JP | 6-160177 A | | 6/1994 |
| JP | 06160177 A | * | 6/1994 |
| JP | 7-043215 A | | 2/1995 |
| JP | 07043215 A | * | 2/1995 |
| JP | 8-075691 A | | 3/1996 |
| JP | 08075691 A | * | 3/1996 |
| JP | 10-090073 A | | 4/1998 |
| JP | 2011033444 A | * | 2/2011 |

OTHER PUBLICATIONS

PCT/JP2009/067833 Written Opinion dated Nov. 6, 2009.

* cited by examiner

*Primary Examiner* — Lisa Caputo
*Assistant Examiner* — Jamel Williams
(74) *Attorney, Agent, or Firm* — Dickstein Shapiro LLP

(57) ABSTRACT

A thermal sensor that includes a ceramic body formed of NTC thermister ceramic, heat sensing part electrodes, temperature compensation part electrodes, external electrodes, and a cavity. A heat sensing part, which is the surface layer of the ceramic body, is heated by, for example, radiant heat transfer, reducing the resistance value of a thermister ceramic layer between the heat sensing part electrodes. Since the heat of the heat sensing part of the ceramic body is insulated by the cavity and thus prevented from diffusing, the heat capacity of the heat sensing unit is reduced, obtaining high sensitivity and high responsiveness.

14 Claims, 26 Drawing Sheets

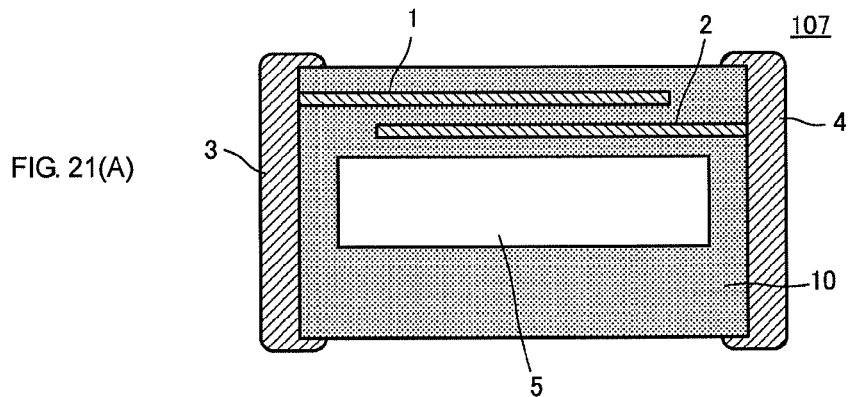
FIG. 21(A)
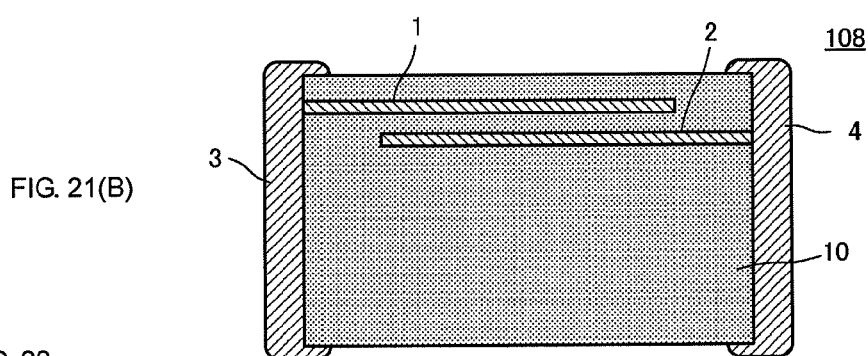
FIG. 21(B)
FIG. 22
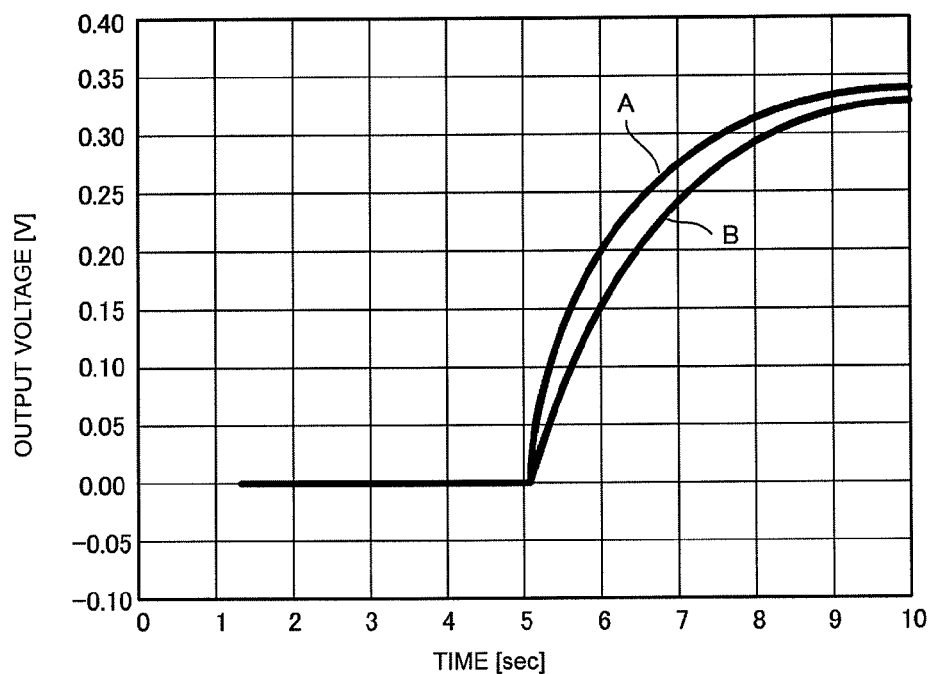

THERMAL SENSOR, NON-CONTACT THERMOMETER DEVICE, AND NON-CONTACT TEMPERATURE MEASUREMENT METHOD

CROSS REFERENCE TO RELATED APPLICATIONS

The present application is a continuation of International Application No. PCT/JP2009/067833, filed Oct. 15, 2009, which claims priority to Japanese Patent Application No. JP2008-265945, filed Oct. 15, 2008, and Japanese Patent Application No. JP2009-179022, filed Jul. 31, 2009, the entire contents of each of these applications being incorporated herein by reference in their entirety.

FIELD OF THE INVENTION

The present invention relates to a thermistor bolometer-type thermal sensor for use in non-contact temperature detection sensors, human body detection sensors, and the like, a non-contact thermometer device, and a non-contact temperature measurement method.

BACKGROUND OF THE INVENTION

Generally, infrared sensors are categorized into two types: quantum sensors using the photoelectric effect of semiconductor and thermal sensors using temperature increase due to the absorption of radiant heat. The former have high measurement accuracy and good responsiveness but have disadvantages such as their narrow wavelength range and unusability at room temperature. While the latter are inferior to quantum sensors in sensitivity and responsiveness, they have a simple structure, can sense a wide range of wavelength, and are usable even at room temperature.

Typical thermal sensors include thermocouple-type using a thermopile, pyroelectric-type using the pyroelectric effect of a piezoelectric substance, and bolometers using variations in resistance.

Bolometer-type infrared sensors are required to have high sensitivity and high responsiveness and be small and low-cost.

Patent Documents 1 and 2 disclose traditional thermistor bolometer-type infrared sensors.

Patent Document 1 discloses an infrared sensor where a temperature compensation thermistor chip and an infrared sensing thermistor chip are disposed with an insulator therebetween above a stem sealing a cap.

FIG. 1 is a drawing showing the configuration of the infrared sensor of Patent Document 1. This infrared sensor includes a stem 11, a cap 12, an infrared incident window 13, an insulating substrate 14, thermistor chips 15 and 16, a thermal and electrical insulator 17, pins 18, electrodes 19, and lead lines 20.

Patent Document 2 as a structure similar to Patent Document 1 discloses an infrared sensor where a base electrode film, a thermistor film and a temperature compensation part electrode film are formed on both surfaces of a flat insulating ceramic substrate.

Patent Document 1: Japanese Unexamined Utility Model Registration Application Publication No. 60-11042

Patent Document 2: Japanese Unexamined Patent Application Publication No. 10-90073

In the configuration of Patent Document 1, the infrared sensing thermistor chip 15 is mounted above the temperature compensation thermistor chip 16 with the thermal and electrical insulator 17 therebetween. Thus, it is believed that the thermal resistance from the infrared sensing thermistor chip 15 to the stem 11 is high and that a large temperature difference can be made between the infrared sensing thermistor chip 15 and the temperature compensation thermistor chip 16 so that detection sensitivity can be increased. However, the heat sensing part is the infrared sensing thermistor chip 15 having a predetermined thickness of 0.5 mm×1.0 mm×0.2 mm and thus has a large heat capacity. Further, since the thermal and electrical insulator 17 is disposed between the infrared sensing thermistor chip 15 and the temperature compensation thermistor chip 19, sufficient thermal separation is not achieved and thus sufficient sensitivity is not easily obtained. Meanwhile, when the heat capacity of the infrared sensing thermistor chip 15 itself is small, the heat insulation effect of the thermal and electrical insulator 17 is effectively exhibited. To reduce the heat capacity of the infrared ray sensing thermistor chip 15, the thermistor chip 15 alone must be formed extremely thinly. In such a case, it is unrealistic to use air as the thermal and electrical insulator 17 and support the infrared sensing thermistor chip 15 by only the lead lines 20a and 20b. Further, the sensor must be a component with the pin terminals 18 and thus cannot be formed as a small, surface-mountable infrared sensor.

As for the configuration of Patent Document 2, a base electrode is formed on both surfaces of an alumina wafer, and a thin-film thermistor is formed on the base electrode by sol-gel process. In this case, the heat capacity can be reduced, since the infrared absorption film is formed as a thin film. However, the method of forming the infrared absorption film as a thin film by sol-gel process or the like includes complicated steps and thus not suitable for mass production. Further, cost reduction and miniaturization are difficult.

SUMMARY OF THE INVENTION

Accordingly, an object of the present invention is to provide a thermal sensor that has high detection sensitivity and high responsiveness and is easy to manufacture, surface-mountable, and small, and a non-contact temperature measurement method.

To solve the above-mentioned problems, a thermal sensor, a non-contact thermometer device, and a non-contact temperature measurement method of the present invention are configured as follows.

The thermal sensor includes: a ceramic body; a heat sensing part formed adjacent to at least a first main surface of the ceramic body and made of a thermistor material; and a heat sensing part electrode disposed within the heat sensing part and intended to detect the resistance value of the heat sensing part. The thermal sensor has a structure where a heat insulation part is formed more internally than the heat sensing part within the ceramic body.

This structure can reduce the heat capacity of the heat sensing unit, increasing the rate of temperature increase due to convective heat transfer or radiant heat transfer, resulting in an increase in detection sensitivity.

Further, this thermal sensor can be easily manufactured by a method similar to that for a general multilayer ceramic component, reducing cost. Furthermore, the formation of the external electrodes on the ceramic body allows formation of a surface-mountable thermal sensor.

The heat insulation part is composed of a cavity disposed within the ceramic body.

Since air has the lowest thermal conductivity among all substances, the formation of the cavity maximizes the heat insulation effect.

In the ceramic body, the periphery forming the surrounding of the heat insulation part, may be composed of a porous member.

In this configuration, the porous layer disposed around the heat insulation part increases the heat insulation effect, further reducing the substantial heat capacity of the heat sensing unit.

The entire heat insulation part may be composed of a porous member.

This configuration makes the transverse strength of the thermistor body higher than that in the case where a cavity is formed.

The ceramic body includes multiple thermistor layers, and the heat sensing part electrodes overlap each other with the thermistor layers therebetween.

The opposing disposition of the heat sensing part electrodes connected to different potentials with the ceramic layers therebetween as described above allows setting of the resistance value between the heat sensing part electrodes to a low value. Thus, a high SN ratio characteristic is obtained.

The thermal sensor further includes: a temperature compensation part disposed in a position adjacent to a second main surface of the ceramic body and opposite to the heat sensing part with the heat insulation part therebetween, the temperature compensation part being made of a thermistor material; and a temperature compensation part electrode disposed within the temperature compensation part and intended to detect the resistance value of the temperature compensation part.

This allows temperature compensation, obtaining stable sensitivity characteristics in a wide temperature range. Further, the disposition of the temperature compensation element causes almost no upsizing. In particular, the integration between the heat sensing part and the temperature compensation part due to co-firing thereof can reduce variations that occur between the heat sensing part and the temperature compensation part (for example, variations in element characteristics among material lots or among lots in the manufacturing process). This is preferable in obtaining uniform temperature characteristics.

The thermal sensor further includes: an external electrode electrically connected to the heat sensing part electrode; and an external electrode electrically connected to the temperature compensation part electrode, and the external electrodes are disposed on outer surfaces of the ceramic body as thermally separated.

This structure can reduce the heat capacity of the heat sensing unit, further increasing the heat insulation between the heat sensing part and the temperature compensation part.

The thermal sensor further includes: a via electrode electrically connected to the heat sensing part electrode; and a via electrode electrically connected to the temperature compensation part electrode, and the via electrodes are unconnectedly disposed in the vertical direction of the ceramic body (the direction passing through the heat sensing part and the temperature compensation part).

This structure reduces the heat capacity of the heat sensing unit, as well as further increases the heat insulation between the heat sensing part and the temperature compensation part.

A relationship $Db/Dc \geqq 1$ is established where Dc represents the interlayer distance between the heat sensing part electrodes opposed to each other in the thickness direction and Db represents the shortest distance between an end portion of the external electrode and an end portion of a heat sensing part electrode formed most adjacent to a surface layer among heat sensing part electrodes connected to a potential different from the potential of the external electrode within the heat sensing part.

This structure can suppress variations in resistance value.

A relationship $D/T \leqq 1/3$ is established where T represents the thickness of the ceramic body and D represents the thickness of the heat sensing part.

This configuration increases the output increase effect.

The heat sensing part receives radiant heat transfer from an object to be measured so that the thermal sensor is used in non-contact thermometers.

The heat sensing part receives radiant heat transfer from a human body so that the thermal sensor is used for human body detection.

A non-contact thermometer device of the present invention includes: the thermal sensor mounted on a mounting substrate; means that detects an amount related to heat received or released by the heat sensing part from or to an object to be measured on the basis of the quantity of electricity detected by the heat sensing part electrode and the quantity of electricity detected by the temperature compensation part electrode; and calculation means that detects an amount related to the temperature of the mounting substrate on the basis of the quantity of electricity detected by the temperature compensation part and calculates the temperature of the object to be measured on the basis of the amount related to the heat received or released by the heat sensing part and the amount related to the temperature of the mounting substrate.

A method for non-contact temperature measurement of the present invention includes: detecting an amount related to heat received or released by the heat sensing part from or to an object to be measured on the basis of the quantity of electricity detected by the heat sensing part electrode and the quantity of electricity detected by the temperature compensation part electrode; and detecting an amount related to the temperature of the mounting substrate on the basis of the quantity of electricity detected by the temperature compensation part and detecting the temperature of the object to be measured on the basis of the amount of the heat received or released by the heat sensing part and the amount related to the temperature of the mounting substrate.

This allows non-contact, relative detection of variations in the temperature of the object to be measured, as well as measurement of the absolute temperature.

According to the present invention, a thermal sensor can be formed that has high detection sensitivity and high responsiveness and is easy to manufacture, surface-mountable, and small. Thus, non-contact temperature measurement can be made.

BRIEF DESCRIPTION OF THE DRAWINGS

FIG. 21 includes drawings showing two example configurations of thermal sensors for human body detection.

FIG. 22 is a graph showing variations in the voltage detected by two thermal sensors 107 and 108 shown in FIG. 21 at the time of approach of a human body (heat source).

DETAILED DESCRIPTION OF THE INVENTION

<<First Embodiment>>

Figure 1:
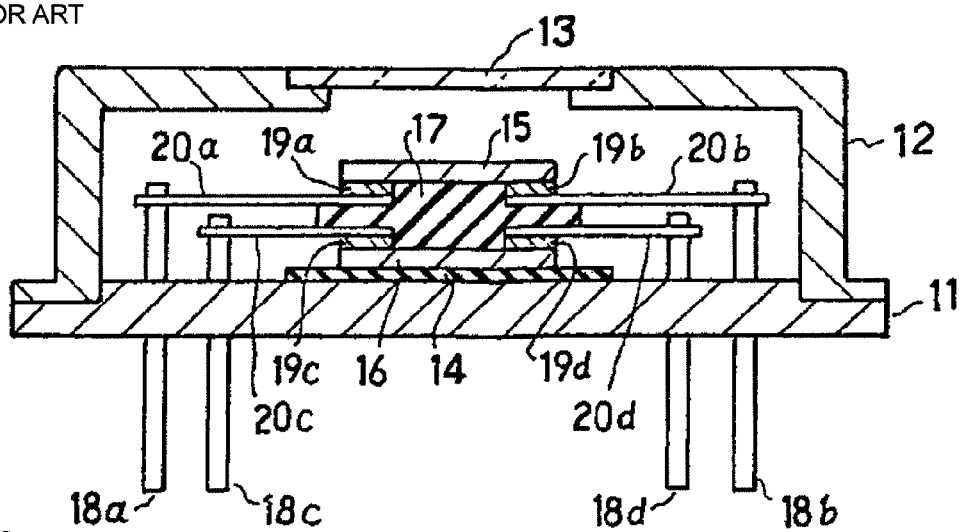
FIG. 1 is a drawing showing the configuration of an infrared sensor of Patent Document 1.
Figure 2:
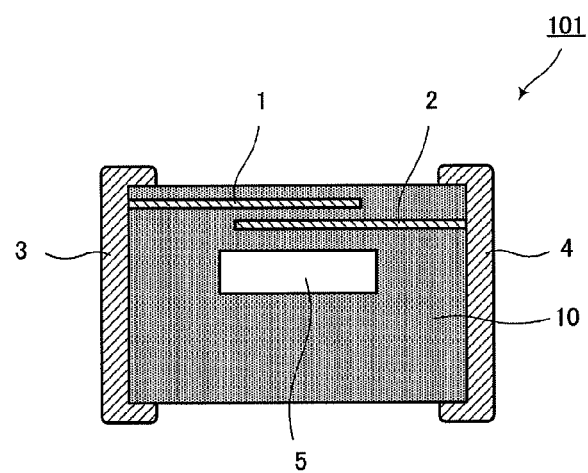
FIG. 2 is a sectional view of a thermal sensor 101 according to a first embodiment.

FIG. 2 is a sectional view of a thermal sensor 101 according to a first embodiment. The thermal sensor 101 includes a ceramic body 10, which is the main body of the thermal sensor and is formed of negative temperature coefficient (NTC) thermistor ceramic, heat sensing part electrodes 1 and 2, external electrodes 3 and 4, and a cavity 5.

The vicinity of the surface layer of a first main surface of the ceramic body 10 serves as the heat sensing part and is heated by the transfer of convective heat, radiant heat, or the like from the heat source. The heat sensing part electrode 1 and 2 are disposed in positions that are in the vicinity of the above-mentioned surface layer of the ceramic body 10 and where the resistance value of the thermistor of the heat sensing part is detected. Specifically, the heat sensing part electrode 1, on the one hand, expands in the form of a plane at a given depth from the surface of the ceramic body 10 to which convective heat or radiant heat from the heat source is transferred. The heat sensing part electrode 2, on the other hand, has a relationship where part thereof is opposed to the heat sensing part electrode 1, is layered with a thermistor ceramic layer between the heat sensing part electrodes 1 and 2 in the thickness direction of the thermistor ceramic layer, and expands in the form of a plane at a given depth from the surface.

The thermistor ceramic of the ceramic body 10 is semiconductor ceramic whose resistance value varies with variations in temperature and may be an NTC thermistor material obtained by sintering oxides of multiple transition metals such as manganese, nickel, cobalt, iron, copper, aluminum, titanium, and zinc or may be a $BaTiO_3$-based PTC thermistor material containing, for example, a rare-earth element as a donor.

Any material may be selected for the heat sensing part electrodes 1 and 2 as long as the material is an electrode material capable of making ohmic contact with the thermistor ceramic. For example, if the thermistor ceramic used as the ceramic body is an NTC thermistor material, the heat sensing part electrodes 1 and 2 are formed using Ag, Pd, Pt, an alloys thereof or the like; if the thermistor ceramic is a PTC thermistor material, the electrodes are formed using Ni, Cu, Al, an alloy thereof, or the like.

Since the resistances of the heat sensing part electrodes 1 and 2 can be adjusted using the opposing distance therebetween and the overlap area therebetween in a plan view of the ceramic body 10, the patterns and layer positions of the heat sensing part electrodes 1 and 2 are determined in accordance with the resistivity (specific resistance) of the thermistor ceramic in order to obtain a desired resistance value.

The external electrodes 3 and 4 are formed on both end surfaces of the ceramic body 10 and are electrically connected to the heat sensing part electrodes 1 and 2, respectively.

The cavity 5 thermally separates the surface layer serving as the heat sensing part and the part below the surface layer (the main part of the ceramic body) in the ceramic body 10. While the ceramic body 10 is formed by layering and firing multiple green sheets, the cavity 5 is formed by making some of thermistor ceramic green sheets into ceramic green sheets having an aperture filled with an organic substance or the like, layering the ceramic green sheets, and firing them to volatilize the organic substance.

In the thermal sensor 101 having the above-mentioned configuration, convective heat or radiant heat from the heat source is transferred to the surface of the ceramic body 10 having the heat sensing part electrodes 1 and 2 formed thereon, resulting in an increase in the temperature of the thermistor ceramic layer of the heat sensing part.

In the detection of radiant heat (infrared radiation) from an object to be measured, the thermistor ceramic layer of the surface layer absorbs infrared radiation from the upper heat sensing part electrode 1 and thus heats up, since the heat sensing part electrodes 1 and 2 transmit almost no infrared radiation. This heat is transferred inwardly from the heat sensing part electrode 1, reducing the resistance value of the thermistor ceramic layer interposed between the heat sensing part electrodes 1 and 2.

In the detection of the temperature of the object to be measured using convective heat transfer, the thermistor ceramic layer interposed between the heat sensing part electrodes 1 and 2 is heated by convective heat transfer so that the resistance value of the thermistor ceramic layer is reduced.

Figure 3A:
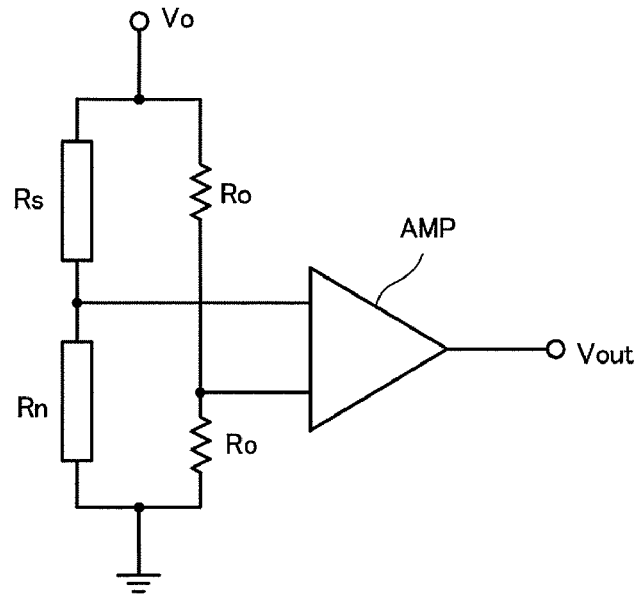
FIG. 3 includes examples of thermal sensor circuits using the thermal sensor 101.
Figure 3B:
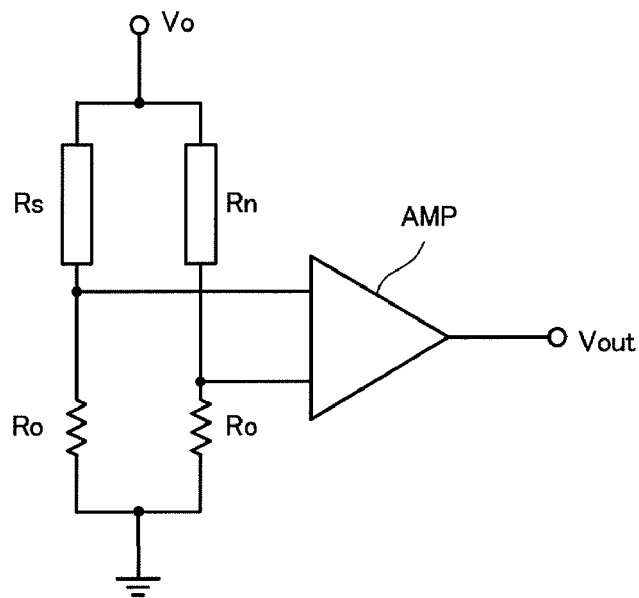

FIGS. 3(A) and 3(B) are two examples of thermal sensor circuits using the thermal sensor 101. In FIGS. 3(A) and 3(B), a resistance Rs is the resistance of the thermistor of the heat sensing part, and a resistance Rn is the resistance of the thermistor of the temperature compensation part. The resistances Rs and Rn and resistors Ro form a resistance bridge circuit. An amplifier circuit AMP differentially amplifies the output voltage of the resistance bridge circuit.

Since the thermal sensor circuits shown in FIG. 3 compensate for the influence of a variation in ambient temperature using the thermistor Rn of the temperature compensation part, the output voltage vout of the amplifier circuit AMP takes a value corresponding to the amount of heating of the thermistor Rs of the heat sensing part. For this reason, the output voltage vout can be used as a heat detection signal.

As seen, heat can be detected by measuring a variation in resistance due to an increase in temperature using the heat sensing part electrodes 1 and 2 and the external electrodes 3 and 4.

As seen in the heat sensor circuit shown in FIG. 3(A), a high SN ratio is obtained by forming one of two current paths using a series circuit composed of the resistance Rs of the thermistor of the heat sensing part and the resistance Rn of the thermistor of temperature compensation part and forming the other using a series circuit composed of the two resistors Ro.

Specifically, in the circuit configuration shown in FIG. 3(B), a large differential voltage cannot be obtained unless the resistance value of the resistor Ro is made almost equal to the resistance value of the resistance Rs of the thermistor of the heat sensing part and the resistance value of the resistance Rn of thermistor of the temperature compensation part. On the other hand, in the circuit configuration shown in FIG. 3(A), the resistance value of the resistor Ro does not need to be a value approximate to the resistance values of the resistance Rs and the resistance Rn. This increases the degree of flexibility in forming a circuit, as well as allows formation of a circuit having a high SN ratio. For example, the resistance value of the resistor Ro can be sufficiently reduced so that the input impedance to the amplifier circuit AMP can be reduced.

The above-mentioned heat is also transferred to the thermistor ceramic layer below the heat sensing part electrode 2. However, since the cavity 5 is present below (more internally than) the thermistor ceramic layer, thermal separation occurs here, stopping the spread of the heat through the ceramic body 10. In other words, the disposition of the cavity reduces the heat capacity of the heat sensing part. This results in an increase in the rate of increase in the temperature of the heat sensing part due to convective heat transfer or radiant heat transfer, allowing high-sensitivity detection.

Further, this thermal sensor, which is a layered ceramic component, is easy to manufacture, allowing cost reduction. Furthermore, this thermal sensor is surface-mountable by using the external electrodes 3 and 4 and thus can be miniaturized and cost-reduced, compared with traditional thermal sensors packaged using a metal case or thermal sensors where elements are embedded in a substrate.

As shown in FIG. 2, the opposing disposition of the two heat sensing part electrodes, 1 and 2, allows setting of the resistance value between the heat sensing part electrodes 1 and 2 to a low value. Thus, a high SN-ratio characteristic is easily obtained when forming a detection circuit.

The specific manufacturing method is as follows. Hereafter, an example of a ceramic body formed of thermistor ceramic using an NTC thermistor material will be described. First, transition metal oxides, $Mn_3O_4$, NiO, $Co_3O_4$, $Fe_2O_3$, and the like, are weighed in predetermined amounts. Then, the weighed transition metal oxides are put into a ball mill containing a grinding medium such as zirconia and sufficiently wet ground, and then calcined at a predetermined temperature to manufacture a ceramic powder.

Next, an organic binder is added to the above-mentioned ceramic powder, wet mixing is performed to obtain slurry, and the slurry is then shaped using doctor blade or the like to manufacture ceramic green sheets.

Next, of the ceramic green sheets, ceramic green sheets to be located in the heat sensing part or temperature compensation part is subjected to screen printing of an internal electrode paste containing Ag—Pd as a main ingredient so as to form an internal electrode pattern. For ceramic green sheets to be located around the cavity, a hole is made on the ceramic green sheets by laser processing or the like, and the hole is filled with a material which volatilizes when fired, for example, an organic substance such as a binder, a carbon paste, or the like so as to form a cavity pattern.

Next, the ceramic green sheets having the internal electrode pattern screen-printed thereon and the ceramic green sheets having the cavity pattern formed thereon are layered and then interposed vertically between ceramic green sheets having no electrode pattern screen-printed thereon, and all the ceramic green sheets are bonded to one another with pressure to form a multilayer body. Next, this multilayer body is cut into a predetermined size, put into a box made of zirconia, subjected to de-binding, and then fired at a predetermined temperature (e.g., 1000° C. to 1300° C.). This results in volatilization of the organic substance such as a binder, carbon paste, or the like, forming a cavity near the center of the ceramic body. In this way, the ceramic body 10 including the heat sensing part electrodes 1 and 2 and the cavity 5 is formed.

Subsequently, an external electrode paste containing Ag or the like is applied and fired to both end portions of the ceramic body 10 to form the external electrodes 3 and 4. The external electrodes 3 and 4 preferably have good adhesiveness and may be formed using a thin-film formation method such as sputtering or vacuum deposition.

While, in this first embodiment, oxides such as MnO are used as materials for the ceramic body, a carbonate, hydroxide, or the like of Mn may be used.

<<Second Embodiment>>

Figure 4:
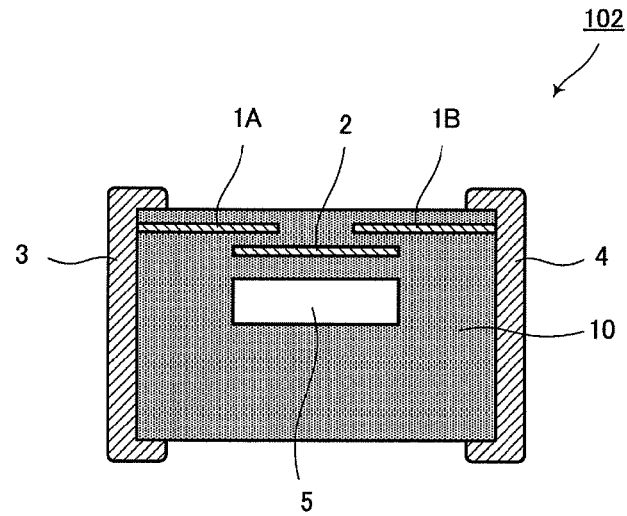
FIG. 4 is a sectional view of a thermal sensor 102 according to a second embodiment.

FIG. 4 is a sectional view of a thermal sensor 102 according to a second embodiment. The thermal sensor 102 includes a ceramic body 10 formed of NTC thermister ceramic, heat sensing part electrodes 1A, 1B, and 2, external electrodes 3 and 4, and a cavity 5.

The heat sensing part electrodes 1A, 1B, and 2 are disposed in positions where the resistance value of the thermistor layer interposed between the heat sensing part electrodes 1A and 1B of the heat sensing part is detected. In the detection of radiant heat (infrared radiation) from an object to be measured, the heat sensing part electrodes 1A and 1B expand in the form of planes in a layer at a given depth from the surface of the ceramic body 10 on which infrared radiation is incident, while the heat sensing part electrode 2 expands in the form of a plane in a layer at a given depth from the surface so that parts thereof are opposed to the heat sensing part electrodes 1A and 1B with a thermistor ceramic layer therebetween.

The heat sensing part electrode 2 is not electrically connected to any of the external electrodes 3 and 4; the heat sensing part electrodes 1A and 1B are electrically connected to the external electrodes 3 and 4, respectively.

The configurations of the other parts are the same as those in the thermal sensor 101 shown in FIG. 2. The basic manufacturing method is the same as that shown in the first embodiment.

The structure shown in FIG. 4 relatively increases the volume from the surface of the ceramic body to the lower heat sensing part electrode 2. Thus, the absorption efficiency of infrared radiation becomes higher than that in the thermal sensor of FIG. 2 having an equivalent heat capacity, and the thermistor ceramic layer whose resistance value is to be measured is heated directly. As a result, high sensitivity and high responsiveness are obtained.

Various internal electrode structures can be used as the pattern design of the internal electrodes of the heat sensing part electrode and the temperature compensation electrode part. For example, the heat sensing part electrode and the temperature compensation electrode part may have a structure including only opposed electrodes, where internal electrodes forming a pair are opposed to each other on the same plane (a structure where the heat sensing part electrode 2 of FIG. 4 is not formed).

<<Third Embodiment>>

Figure 5:
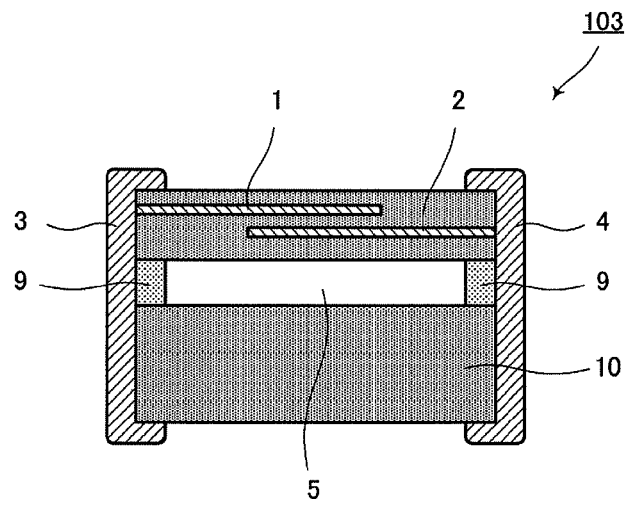
FIG. 5 is a sectional view of a thermal sensor 103 according to a third embodiment.

FIG. 5 is a sectional view of a thermal sensor 103 according to a third embodiment. The thermal sensor 103 includes a ceramic body 10 formed of NTC thermister ceramic, heat sensing part electrodes 1 and 2, external electrodes 3 and 4, a cavity 5, and a porous part 9.

The above-mentioned porous part 9 is a periphery of the thermistor ceramic body forming the surrounding of the cavity 5 and is a part made porous when fired. Specifically, an organic substance which is to disappear during firing is previously distributed in a ceramic green sheet having an aperture where the cavity 5 is to be formed.

For example, in the structure shown in FIG. 2 in the first embodiment, the heat insulation effect is increased as the width of the cavity 5 is increased. On the other hand, in order to secure the cavity 5, the periphery supporting the surrounding of the cavity 5 must be left. For this reason, the periphery supporting the surrounding of the cavity 5 is made porous, as shown in FIG. 5. Thus, the part below the heat sensing part electrode 2 is more effectively thermally insulated by the cavity 5 as well as by the porous part 9. This allows a further reduction of the heat capacity of the heat sensing part.

<<Fourth Embodiment>>

Figure 6:
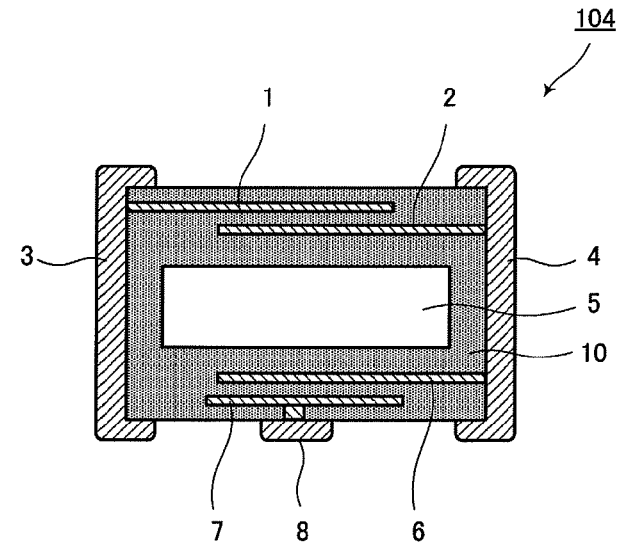
FIG. 6 is a sectional view of a thermal sensor 104 according to a fourth embodiment.

FIG. 6 is a sectional view of a thermal sensor 104 according to a fourth embodiment. The thermal sensor 104 includes a ceramic body 10 formed of NTC thermister ceramic, heat sensing part electrodes 1 and 2, temperature compensation part electrodes 6 and 7, external electrodes 3, 4, and 8, and a cavity 5.

The configurations other than the temperature compensation part electrodes 6 and 7 and the external electrode 8 are the same as those in the thermal sensor 101 shown in FIG. 2. The basic manufacturing method is the same as that shown in the first embodiment.

In the detection of radiant heat (infrared radiation) from an object to be measured, the heat sensing part, which is the surface layer of a first main surface of the ceramic body 10, is heated by incident infrared radiation. Infrared radiation is not incident on the temperature compensation part, which is opposed to the heat sensing part with the cavity 5 therebetween and is the surface layer of a second main surface of the ceramic body 10. This temperature compensation part is provided with the temperature compensation part electrodes 6 and 7.

The opposing area and distance between the temperature compensation part electrodes 6 and 7 are approximately the same as those between the heat sensing part electrodes 1 and 2. The cavity 5 is present between the pair of the heat sensing part electrodes 1 and 2 and the pair of the temperature compensation part electrodes 6 and 7. Thus, when infrared radiation incident on the ceramic body 10 increases the temperature of the heat sensing part, the cavity insulates the heat. For this reason, the temperature compensation part electrodes 6 and 7 parts can maintain the surrounding ambient temperature.

In the detection of the temperature of an object to be measured using convective heat transfer, the heat sensing part is heated by convective heat transfer from the object to be measured. On the other hand, the temperature compensation part does not receive most of the heat from the object to be measured, since it is thermally insulated by the cavity 5.

The resistance value between the heat sensing part electrodes 1 and 2 is detected by the external electrodes 3 and 4, and the resistance value between the temperature compensation part electrodes 6 and 7 is detected by the external electrodes 4 and 8.

If the resistance Rs shown in FIG. 3 is used as the resistance of the thermistor ceramic layer between the heat sensing part electrodes 1 and 2 and if the resistance Rn shown in FIG. 3 is used as the resistance of the thermistor ceramic layer between the temperature compensation part electrodes 6 and 7, the characteristics of the output voltage vout with respect to convective heat transfer or radiant heat transfer from the object to be measured can be kept constant almost without being influenced by variations in surrounding ambient temperature.

In the embodiments described above, the ceramic body is formed by layering and sintering the thermistor ceramic layers formed of a thermistor material. Alternatively, the ceramic body may be formed by forming at least a layer adjacent to the first main surface in which the heat sensing part is to be disposed and a layer adjacent to the second main surface in which the temperature compensation part is to be disposed using thermistor ceramic layers and forming the other layers using layers made of another material and sintering all the layers integrally.

While, in the example shown in FIG. 6, the heat insulation part is formed using the cavity 5, the area corresponding to the cavity 5 or all of the layer in which the cavity 5 is formed may be formed using a porous material.

While, in the above-mentioned examples, the single cavity 5 is disposed, multiple cavities 5 may be disposed vertically or horizontally. As for the shape of the cavity, closed space may be formed within the ceramic body, or the cavity may have one or more apertures. Further, a honeycomb structure or cell structure may be employed. These configurations allow adjustment of thermal resistance.

<<Fifth Embodiment>>

In a fifth embodiment, a non-contact temperature measurement method, by which the temperature of an object to be measured is measured contactlessly, will be described with reference to FIGS. 7 to 10.

Figure 7:
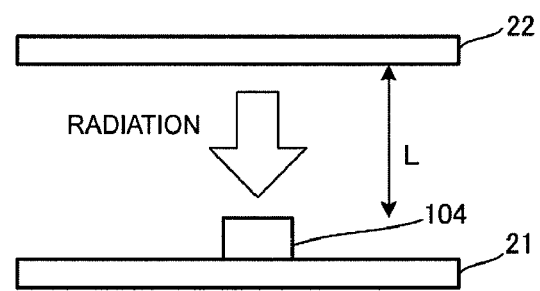
FIG. 7 is a drawing showing the relationship between the thermal sensor 104 and an object to be detected and the mounting state of the thermal sensor.

The non-contact temperature measurement method shown in the fifth embodiment uses the thermal sensor 104 shown in FIG. 6. FIG. 7 is a drawing showing the relationship between the thermal sensor 104 and an object to be detected as well as the mounting state of the thermal sensor.

The thermal sensor 104 is surface-mounted on a mounting substrate 21. The temperature of the object 22 to be detected is measured when the object 22 to be detected approaches the heat sensing part of the thermal sensor 104 in a state where the object 22 to be detected is separated from the heat sensing part by a predetermined distance L. For example, the mounting substrate 21 is a motherboard, and the object 22 to be detected is a memory substrate. A CPU peripheral circuit on the motherboard detects the temperature of the memory substrate or memory chip and performs control corresponding to the detection result.

Figure 8A:
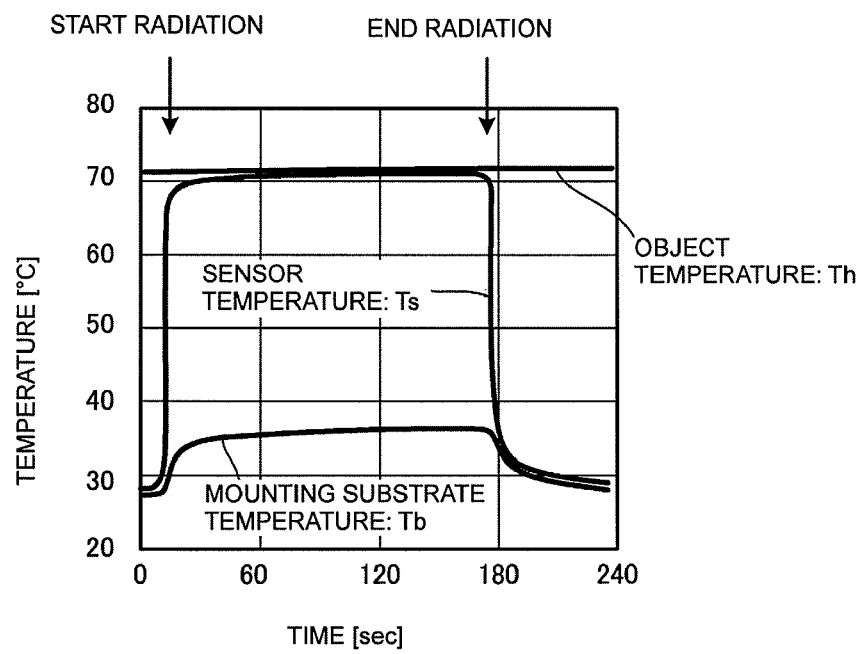
FIG. 8(A) is a graph showing variations in the temperature of an object to be measured, variations in the temperature outputted by the thermal sensor, and variations in the temperature of the mounting substrate at the times of approach and departure of the heat source to and from the thermal sensor.
Figure 8B:
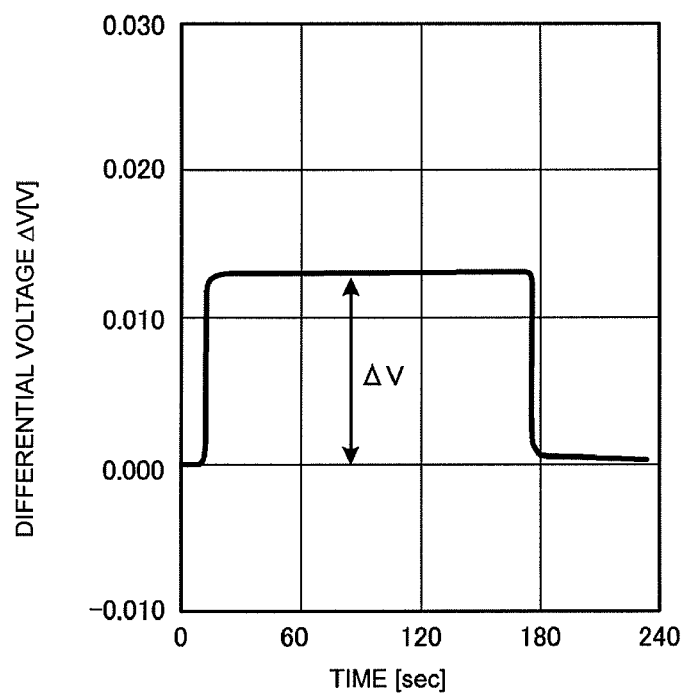
FIG. 8(B) is a graph showing variations in the differential voltage outputted by a thermal sensor circuit using the thermal sensor.

FIG. 8(A) is a graph showing the temperature of the object to be detected, the temperature detected by the thermal sensor, and the temperature of the mounting substrate. FIG. 8(A) is an example where radiation from the object to be detected starts at 20 [sec] and ends 170 [sec].

FIG. 8(A) is a graph showing variations in the voltage detected by a thermal sensor circuit using the above-mentioned thermal sensor. The configuration of the thermal sensor circuit is as shown in FIG. 3. That is, the resistance Rs of the thermistor of the heat sensing part, the resistance Rn of the temperature compensation thermistor, and the two fixed resistances Ro form a resistance bridge circuit, and the amplifier circuit AMP differentially amplifies the output voltage of the resistance bridge circuit.

Figure 9:
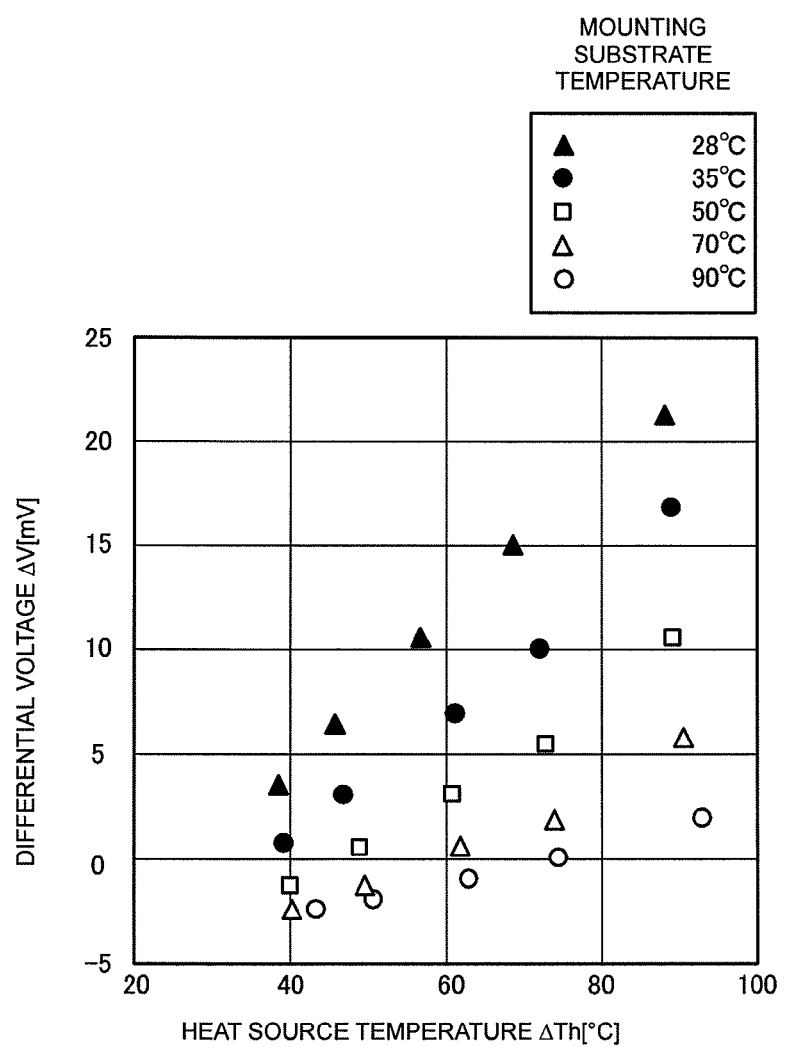
FIG. 9 is a graph showing variations in the differential voltage ΔV when the temperature Tb of the mounting substrate and the temperature Th of the object to be measured (heat source) are changed.

FIG. 9 shows variations in differential voltage (differentially amplified output voltage) $\Delta V$ when causing the object to be detected having a temperature Th to approach the mounting substrate having a temperature Tb so that the mounting substrate and the object are thermally balanced. Note that the temperature Tb of the mounting substrate and the temperature Th of the object to be detected are measured by a general thermometer and that the differential voltage $\Delta V$ represents the output of the thermal sensor of the present invention.

As shown in FIG. 9, the differential voltage $\Delta V$ increases as the temperature Th of the object to be detected increases, while the differential voltage $\Delta V$ decreases as the temperature Tb of the mounting substrate increases.

Figure 10:
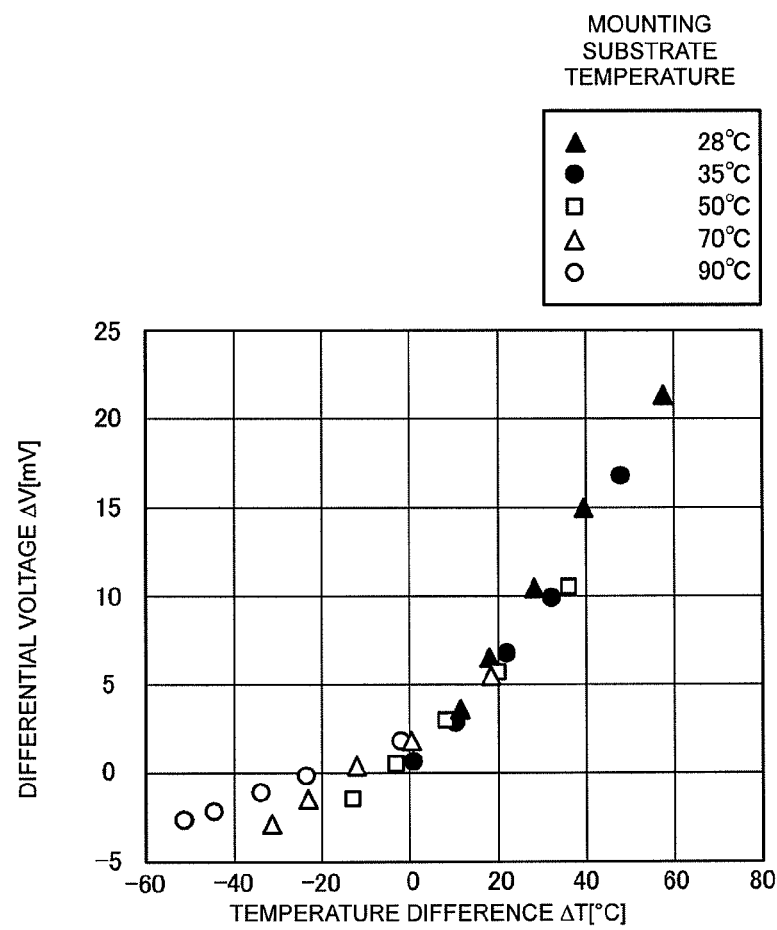
FIG. 10 is a graph where the difference ΔT between the temperature Tb of the mounting substrate and the temperature Th of the object to be measured is used as the horizontal axis and the differential voltage ΔV is used as the vertical axis on the basis of FIG. 9.

FIG. 10 is a graph where the difference $\Delta T$ between the temperature Tb of the mounting substrate and the temperature Th of the object to be measured is used as the horizontal axis and the differential voltage $\Delta V$ is used as the vertical axis on the basis of FIG. 9.

The relational expression at that time satisfies Formula (1) below.

$$\Delta T = Th - Tb \tag{1}$$

From the result of FIG. 10, the $\Delta T$, which is the temperature difference between the temperature Th of the object to be measured and the temperature Tb of the mounting substrate (that is, the temperature of the temperature compensation part), is approximately proportional to the differential voltage $\Delta V$. Thus, Formula (2) holds true, and k is obtained.

$$\Delta T \approx k \Delta V \, (k\text{:factor}) \tag{2}$$

Note that the proportionality factor k varies with the characteristics of the thermal sensor and the thermal sensor circuit and the distance L.

That is, in a thermally balanced state, the temperature difference $\Delta T$ obtained by subtracting the temperature Tb of the mounting substrate from the temperature Th of the object to be measured is approximately proportionate to the differential voltage $\Delta V$.

Use of the k thus obtained allows the thermal sensor of the present invention to obtain the temperature Ts of the object to be detected from the differential voltage $\Delta V$ and an output voltage vb between the temperature compensation part electrodes.

The temperature of the mounting substrate can be detected by the temperature compensation part of the thermal sensor without using a different thermometer. The temperature Tx of the mounting substrate detected by the temperature compensation part of the thermal sensor is a function of the output voltage vb between the temperature compensation part electrodes and can be represented by $$Tx = f(Vb) \tag{3}$$

By using Formulas (1), (2), and (3), the Ts and TX detectable by the thermal sensor according to the present invention are obtained as follows.

$$Ts = \Delta T + Tx \tag{4}$$
$$= k\Delta V + Tx \tag{5}$$
$$= k\Delta V + f(Vb) \tag{6}$$

The temperature Ts of the object to be measured can be obtained from Formula (6).

<<Sixth Embodiment>>

Figure 11:
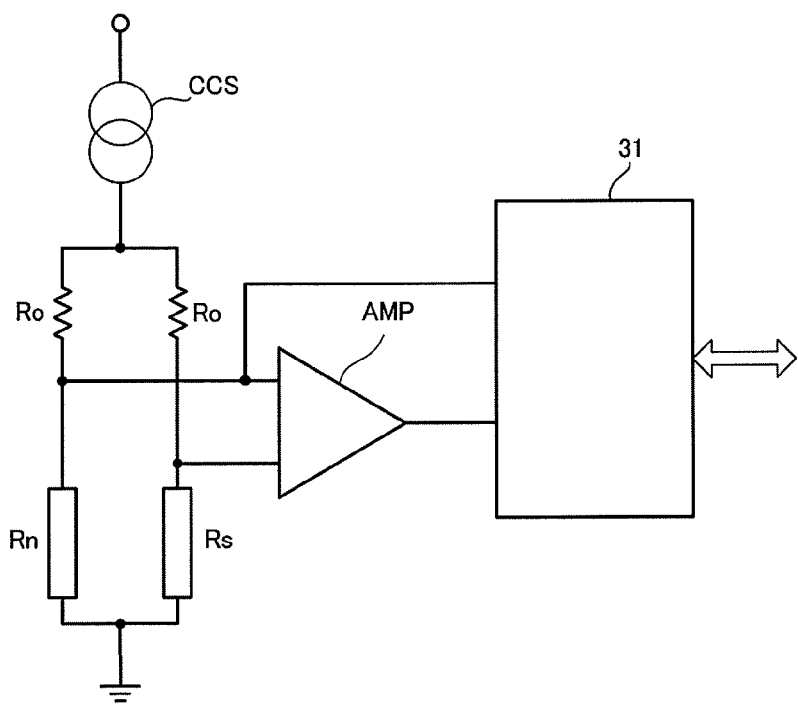
FIG. 11 is a diagram showing the configuration of a non-contact thermometer device according to a sixth embodiment.

FIG. 11 is a diagram showing the configuration of a non-contact thermometer device according to a sixth embodiment.

In FIG. 11, a resistance Rs is a resistance of the thermistor of the heat sensing part, and a resistance Rn is the resistance of the thermistor of the temperature compensation part. The resistances Rs and Rn and two resistances Ro form a resistance bridge circuit. A constant-current circuit (constant-current source) CCS feeds constant current to the resistance bridge circuit. An amplifier circuit AMP differentially amplifies the output voltage of the resistance bridge circuit.

An operation processing part 31 receives the output voltage of the amplifier circuit AMP and the voltage across the resistance Rn and obtains the temperature of the object to be measured by the operation of the above-mentioned Formula (6). The operation processing part 31 also outputs the operation result to the outside.

<<Seventh Embodiment>>

Figure 12A:
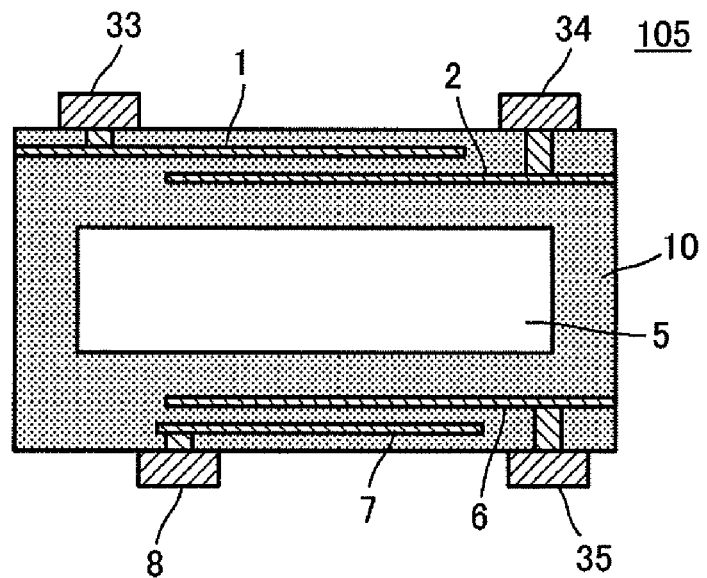
FIGS. 12(A) and 12(B) are sectional views of thermal sensors 105 and 106, respectively, according to a seventh embodiment.
Figure 12B:
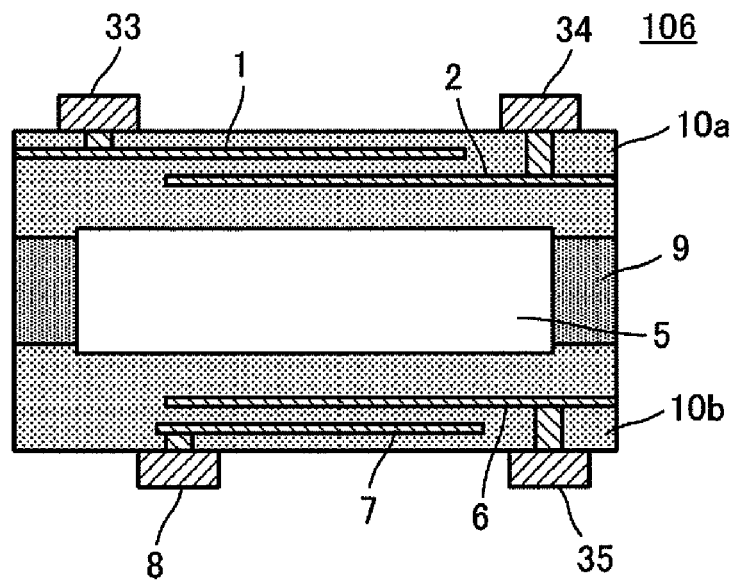

FIGS. 12(A) and 12(B) are sectional views of thermal sensors 105 and 106, respectively, according to a seventh embodiment. The thermal sensor 105 includes a ceramic body 10 formed of NTC thermister ceramic, heat sensing part electrodes 1 and 2, external electrodes 33, 34, 35, and 8, and a cavity 5. In FIG. 12 (B), a porous part 9 is disposed around the cavity 5.

Unlike in the thermal sensor 104 shown in FIG. 6, the external electrodes 33 and 34 electrically connected to the heat sensing part electrodes 1 and 2 and the external electrodes 35 and 8 electrically connected to the temperature compensation part electrodes 6 and 7 are disposed in an electrically and thermally separated manner. That is, no vertically extending external electrodes are formed on the sides of the ceramic body. Via electrodes are disposed in the vertical direction of the ceramic body in a non-contact state (non-penetrating state).

Thus, the heat sensing part and the temperature compensation part can be further thermally isolated, further reducing the heat capacity of the heat sensing part. This can increase the value of the differential voltage ΔV, as well as can steepen its rising edge.

<<Eighth Embodiment>>

Figure 13:
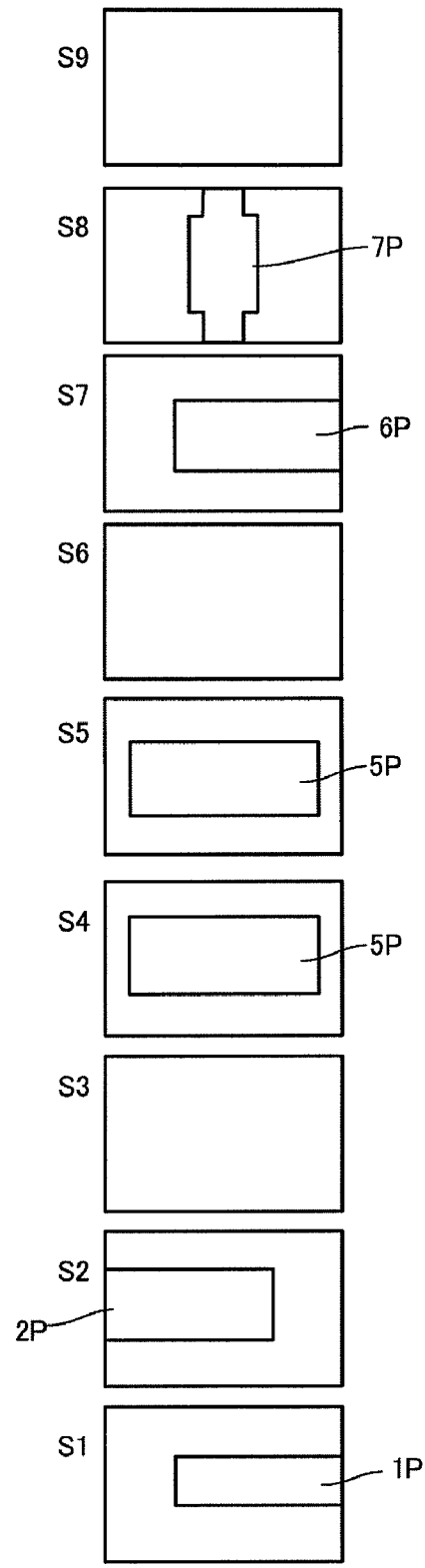
FIG. 13 is a configuration diagram (layer diagram) of ceramic green sheets in the formation of a thermal sensor according to an eighth embodiment using a ceramic multilayer structure.

FIG. 13 is a configuration diagram (layer diagram) of ceramic green sheets in the formation of a thermal sensor according to an eighth embodiment using a ceramic multilayer structure. In FIG. 13, an internal electrode paste 1P to become a heat sensing part electrode 1 when fired later is formed on a layer S1, and an internal electrode paste 2P to become a heat sensing part electrode 2 when fired later is formed on a layer S2. In FIG. 13, an internal electrode paste 6P to become a temperature compensation part electrode 6 when fired later is formed on a layer S7, and an internal electrode paste 7P to become a temperature compensation part electrode 7 when fired later is formed on a layer S8. Holes are made on layers S4 and S5, and a filler 5P which is a material to volatize when fired, for example, an organic substance such as a binder, or carbon paste is formed in the holes.

Figure 14:
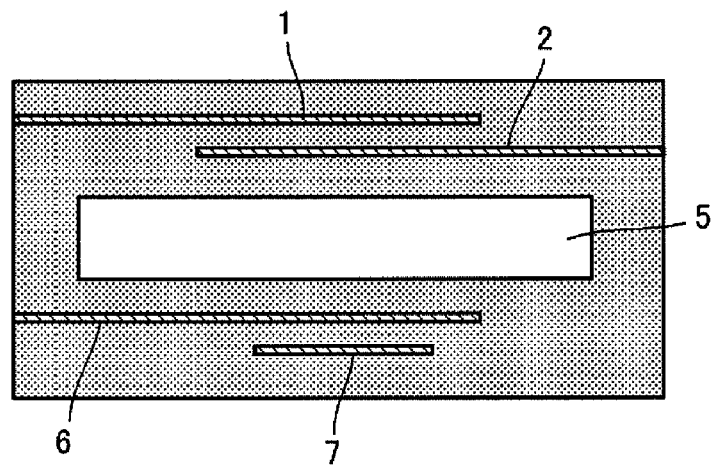
FIG. 14 is a sectional view of a ceramic body formed by layering and firing the ceramic green sheets shown in FIG. 13.

FIG. 14 is a sectional view of a ceramic body formed by layering and firing the ceramic green sheets shown in FIG. 13. Heat sensing part electrodes 1 and 2, temperature compensation part electrodes 6 and 7, and a cavity 5 are formed within the ceramic body.

Figure 15A:
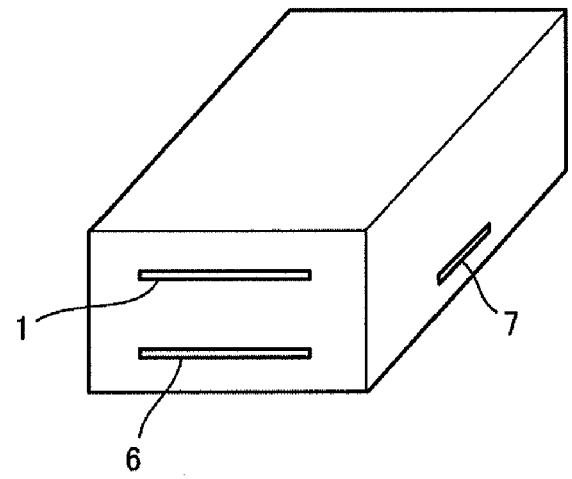
FIG. 15 includes perspective views of states before and after external electrodes are formed on the ceramic body shown in FIG. 14.
Figure 15B:
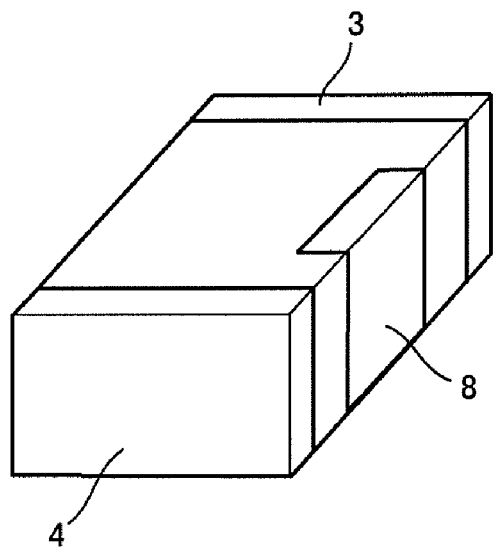

FIG. 15 includes perspective views of states before and after external electrodes are formed on the ceramic body shown in FIG. 14. Specifically, FIG. 15(A) is a perspective view of the ceramic body before external electrodes are formed, and FIG. 15(B) is a perspective view thereof after external electrode are formed.

The external electrode 3 is electrically connected to the heat sensing part electrode 2, and the external electrode 4 is electrically connected to the heat sensing part electrode 1 and the temperature compensation part electrode 6. The external electrode 8 is electrically connected to the temperature compensation part electrode 7.

As seen, since the temperature compensation part electrode 7 formed due to the firing of the internal electrode paste 7P is formed so that it is exposed on two sides of the rectangular parallelepiped-shaped ceramic body, the probability that the orientation of the ceramic body will be aligned in the formation of the external electrode 8 is increased so that manufacturing efficiency is increased.

Note that the internal electrode paste 7P does not necessarily need to be extended to both sides of the ceramic body in the layer S8 and that a structure where the paste 7P is extended to one side may be used. While, in FIG. 15(B), the external electrode 8 is formed on one side, the external electrode 8 may be formed on both sides of the layer S8, since the internal electrode paste 7P is extended to both sides.

<<Ninth Embodiment>>

Figure 16:
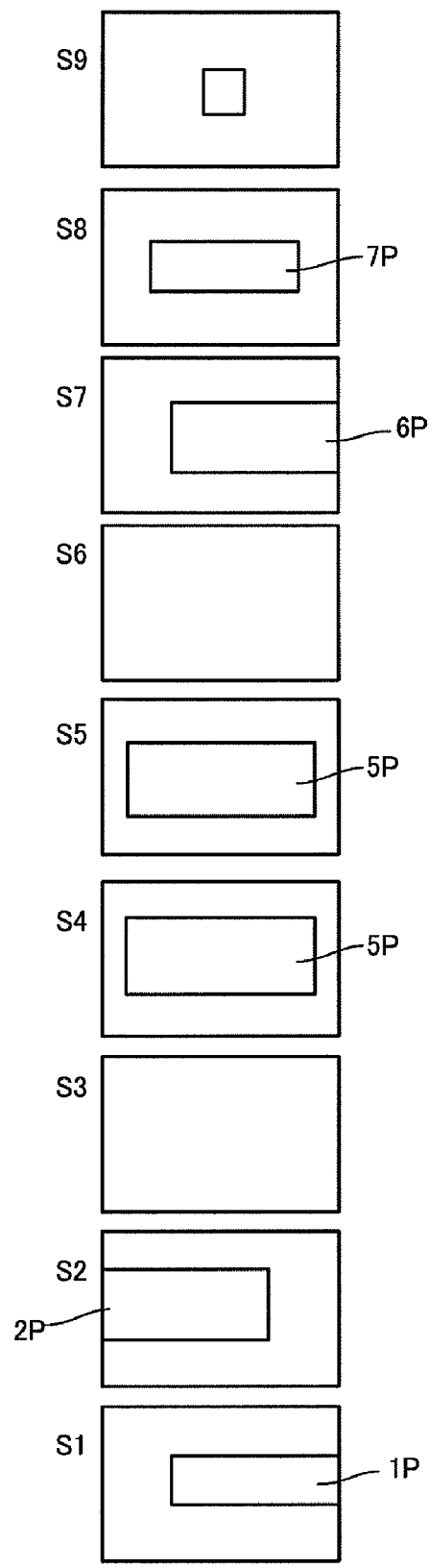
FIG. 16 is a configuration diagram (layer diagram) of ceramic green sheets in the formation of a thermal sensor according to a ninth embodiment using a ceramic multilayer structure.

FIG. 16 is a configuration diagram (layer diagram) of ceramic green sheets in the formation of a thermal sensor according to a ninth embodiment using a ceramic multilayer structure. In FIG. 16, an internal electrode paste 1P to become a heat sensing part electrode 1 when fired later is formed on a layer S1, and an internal electrode paste 2P to become a heat sensing part electrode 2 when fired later is formed on a layer S2. An internal electrode paste 6P to become a temperature compensation part electrode 6 when fired later is formed on a layer S7, and an internal electrode paste 7P to become a temperature compensation part electrode 7 when fired later is formed on a layer S8. Further, an electrode paste 23P for a via electrode is formed on a layer S9. Holes are made on layers S4 and S5, and a filler 5P which is a material to volatize when fired, for example, an organic substance such as a binder, or carbon paste is formed in the holes.

Figure 17:
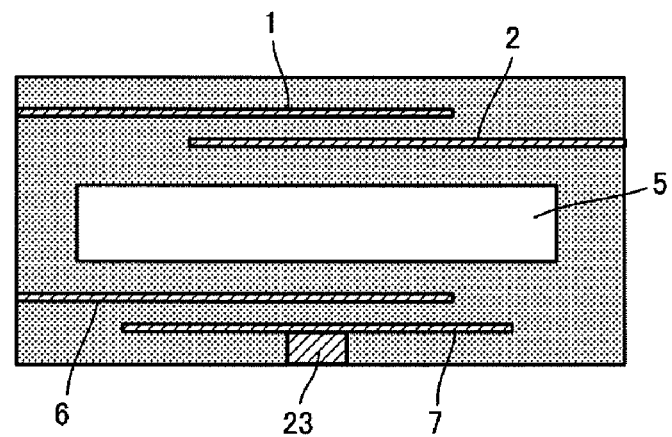
FIG. 17 is a sectional view of a ceramic body formed by layering and firing the ceramic green sheets shown in FIG. 16.

FIG. 17 is a sectional view of a ceramic body formed by layering and firing the ceramic green sheets shown in FIG. 16. Heat sensing part electrodes 1 and 2, temperature compensation part electrodes 6 and 7, a via electrode 23, and a cavity 5 are formed within the ceramic body.

Figure 18A:
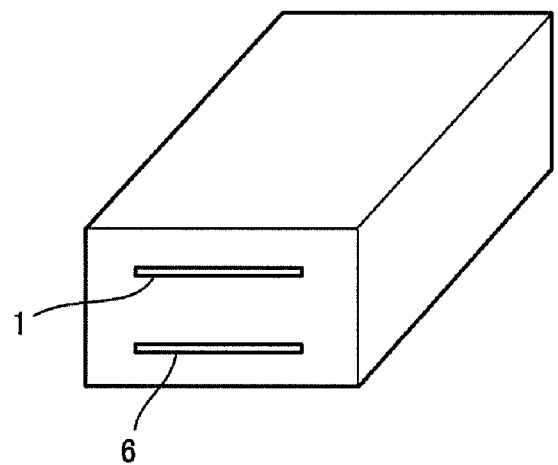
FIG. 18 includes perspective views of states before and after external electrodes are formed on the ceramic body shown in FIG. 17.
Figure 18B:
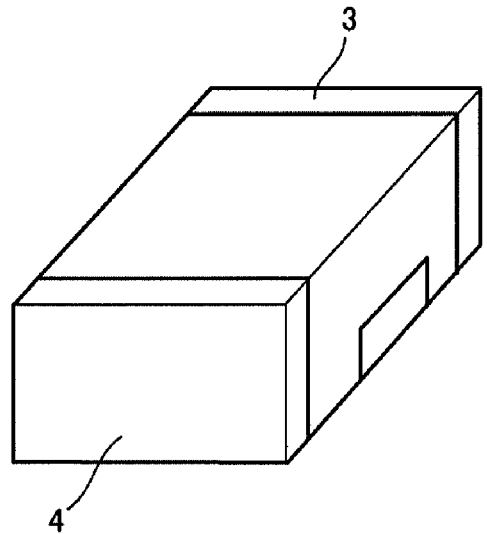
Figure 18C:
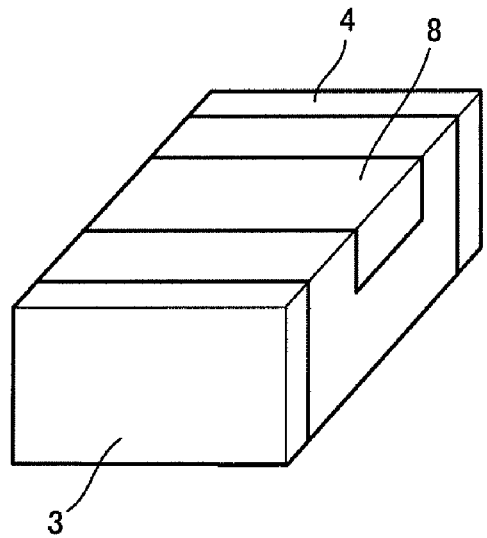
Figure 19A:
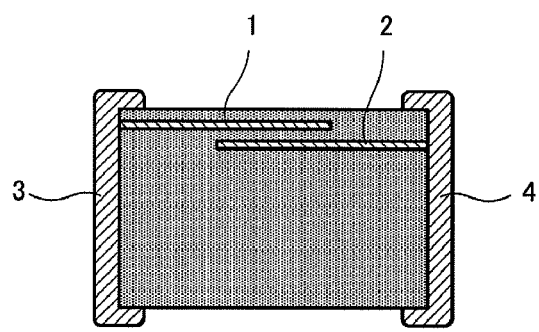
FIG. 19 includes sectional views showing the configurations of four thermal sensors.
Figure 19B:
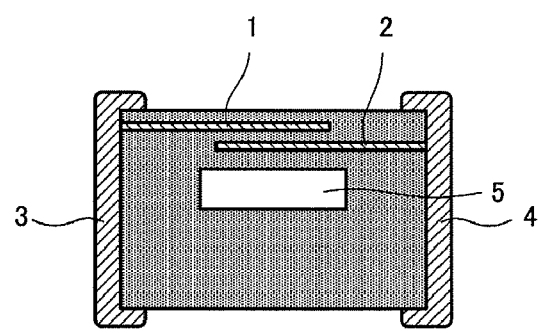
Figure 19B:
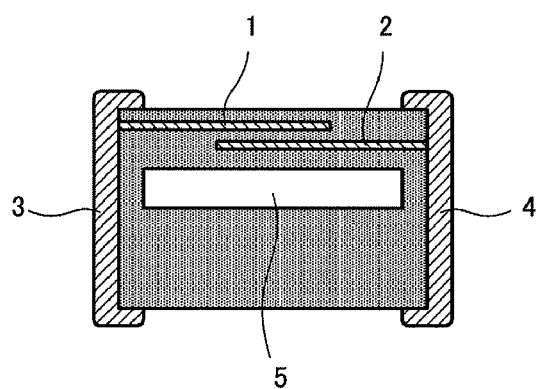
Figure 19D:
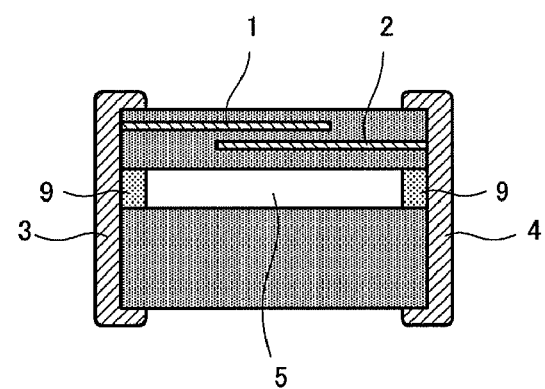

FIG. 18 includes perspective views of states before and after external electrodes are formed on the ceramic body shown in FIG. 17. Specifically, FIG. 18(A) is a perspective view of the ceramic body before external electrodes are formed, FIG. 18(B) is a perspective view thereof after external electrode are formed, and FIG. 18(C) is a perspective view where the opposite side of the state shown in FIG. 18(B) is seen.

An external electrode 3 is electrically connected to the heat sensing part electrode 2, and an external electrode 4 is electrically connected to the heat sensing part electrode 1 and the temperature compensation part electrode 6. An external electrode 8 is electrically connected to the via electrode 23. The central portion of the temperature compensation part electrode 7 is thermally connected to the via electrode 23 with low thermal resistance.

As seen, the via electrode 23 electrically connected to the temperature compensation part electrode 7 is formed in a manner exposed on the central portion of the bottom of the rectangular parallelepiped-shaped ceramic body, and the external electrode 8 electrically connected to the via electrode 23 is formed in a manner extending from the bottom to the opposed two sides. Thus, the contact area between the temperature compensation part and the substrate is increased, allowing effective release of the heat of the temperature compensation part to the substrate. This results in a further increase in the heat capacity difference between the heat sensing part and the temperature compensation part, increasing sensitivity.

Figure 20:
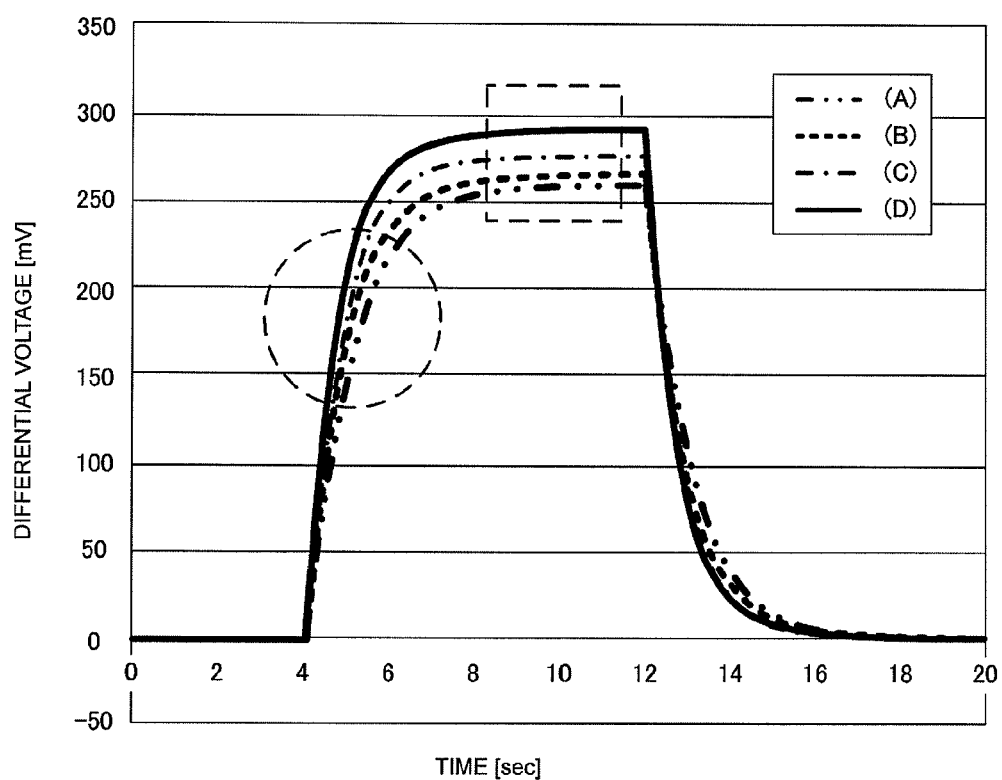
FIG. 20 is a graph showing the sensitivity and responsiveness of the four thermal sensors.

FIGS. 19 and 20 show the results of simulations performed to check the effects of the cavity and the porous part of the thermal sensors shown in the embodiments.

FIG. 19 includes sectional views showing the configurations of the four thermal sensors, and FIG. 20 is a graph showing the sensitivity and responsiveness of the four thermal sensors. FIG. 19(A) shows the thermal sensor where no cavity is disposed below the heat sensing part electrodes 1 and 2. FIG. 19(B) shows the thermal sensor where the cavity 5 extending in the direction of the external electrodes 3 and 4 and having a relatively narrow width is disposed below the heat sensing part electrodes 1 and 2. FIG. 19(C) shows the thermal sensor where the cavity 5 extending in the direction of the external electrodes 3 and 4 and having a relatively wide width is disposed below the heat sensing part electrodes 1 and 2. FIG. 19(D) shows the thermal sensor where the cavity 5 and the porous part 9 are disposed below the heat sensing part electrodes 1 and 2.

The horizontal axis of FIG. 20 is the elapsed time, and the vertical axis thereof is the differential voltage of the resistance bridge circuit when the resistances Rn and Ro of the thermal sensor circuit shown in FIG. 3 equal each other and when the voltage applied to the resistance bridge circuit is 3 [V]. FIG. 20 is an example where radiant heat (infrared radiation) is applied four seconds after the start of measurement and is stopped 12 seconds after the start of measurement.

The conditions for this simulation are as follows.
[Common Parameters]
Size of ceramic body: 2.0 [mm]×1.2 [mm]×0.5 [mm]
Position (depth from surface) of heat sensing part electrode 1: 30 [μm]
Position (electrode-to-electrode distance) of heat sensing part electrode 2: 30 [μm]
[Thermal Sensor (B)]
Size of cavity 5: 1.4 [mm]×0.6 [mm]×0.14 [mm]
[Thermal Sensor (C)]
Size of cavity 5: 1.8 [mm]×1.0 [mm]×0.14 [mm]
[Thermal Sensor (D)]
Size of cavity 5: 1.8 [mm]×1.0 [mm]×0.14 [mm]

As shown in FIG. 20, as for the magnitude (that is, sensitivity) of the differential voltage when the thermal sensors (A), (B), (C), and (D) of FIG. 19 each reach a steady state, there is a relationship of (A)<(B)<(C)<(D). Further, as for the steepness (that is, a time constant corresponding to responsiveness) of the rising edge of the differential voltage after infrared radiation is applied, there is a relationship of (A)<(B)<(C)<(D). As seen, it is understood that both sensitivity and time constant increase as the size of the cavity 5 increases and that sensitivity and time constant further increase by making the surrounding of the cavity porous.

An example of thermal sensors for human body detection will be described with reference to FIGS. 21 and 22.

The thermal sensor is surface-mounted on a mounting substrate, as with the thermal sensor shown in FIG. 7. When an object to be detected approaches the heat sensing part of the thermal sensor, the approach of the object to be detected is detected.

FIG. 21 includes drawings showing two example configurations of thermal sensors for human body detection. FIG. 21(A) is a sectional view of a thermal sensor 107 including a cavity 5, and FIG. 21(B) is a sectional view of a thermal sensor 108 including no cavity. The basic configuration of the thermal sensor 107 is the same as that shown in FIG. 2. The thermal sensor 108 is a thermal sensor not including the cavity 5 of the thermal sensor 107.

FIG. 22 is a graph showing variations in the voltage detected by the two thermal sensors, 107 and 108, shown in FIG. 21 at the time of approach of a human body (heat source). A curve A is a characteristic of the thermal sensor 107, and a curve B is a characteristic of the thermal sensor 108. The configuration of the thermal sensor circuit is as shown in FIG. 3. That is, the resistance Rs of the thermistor of the heat sensing part, the resistance Rn of the temperature compensation thermistor, and the two fixed resistors Ro form a resistance bridge circuit, and the amplifier circuit AMP differentially amplifies the output voltage of the resistance bridge circuit. The temperature compensation thermistor is a thermistor element prepared independently of the thermal sensors 107 and 108 and is mounted on a mounting substrate.

The vertical axis of FIG. 22 is the output voltage of the differential amplifier circuit, and the horizontal axis thereof is the time. In this example, a human body approaches at time 5 [sec].

The conditions under which the result of this actual measurement has been obtained are as follows.
Distance L: 10 cm
Temperature of heat source: 40° C.
Temperature of mounting substrate: 28° C.
Amplification factor of differential amplifier circuit: 200
Applied voltage: 3.0 V
Element size: 2.0×1.2×0.5 mm
Cavity size: 1.6×0.8×0.15 mm Measurements were made under the above-mentioned conditions with no wind. As a result, it is understood that the disposition of the cavity 5 steepens the rising edge of the output voltage, increasing responsiveness even in human body detection applications.

Other examples of thermal sensors for human body detection will be described with reference to FIGS. 23 and 24.

Figure 23A:
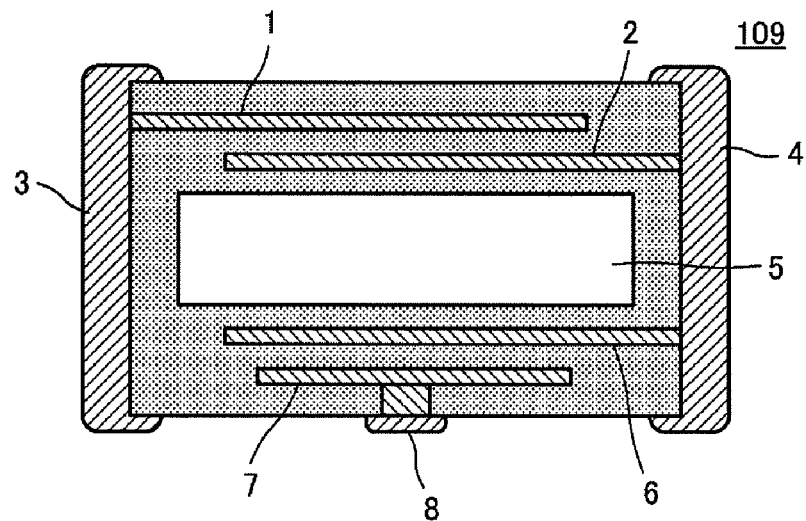
FIG. 23 includes drawings showing two example configurations of thermal sensors for human body detection.
Figure 23B:
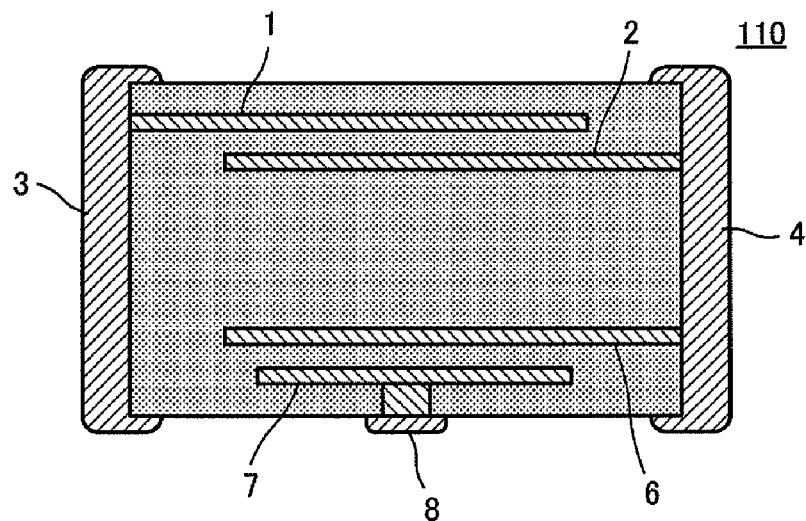

FIG. 23 includes drawings showing two example configurations of thermal sensors for human body detection. FIG. 23(A) is a sectional view of a thermal sensor 109 including a cavity 5 and temperature compensation part electrodes 6 and 7, and FIG. 23(B) is a sectional view of a thermal sensor 110 including no cavity. The basic configuration of the thermal sensor 109 is the same as that shown in FIG. 6. The thermal sensor 110 is a thermal sensor not including the cavity 5 of the thermal sensor 109.

Figure 24:
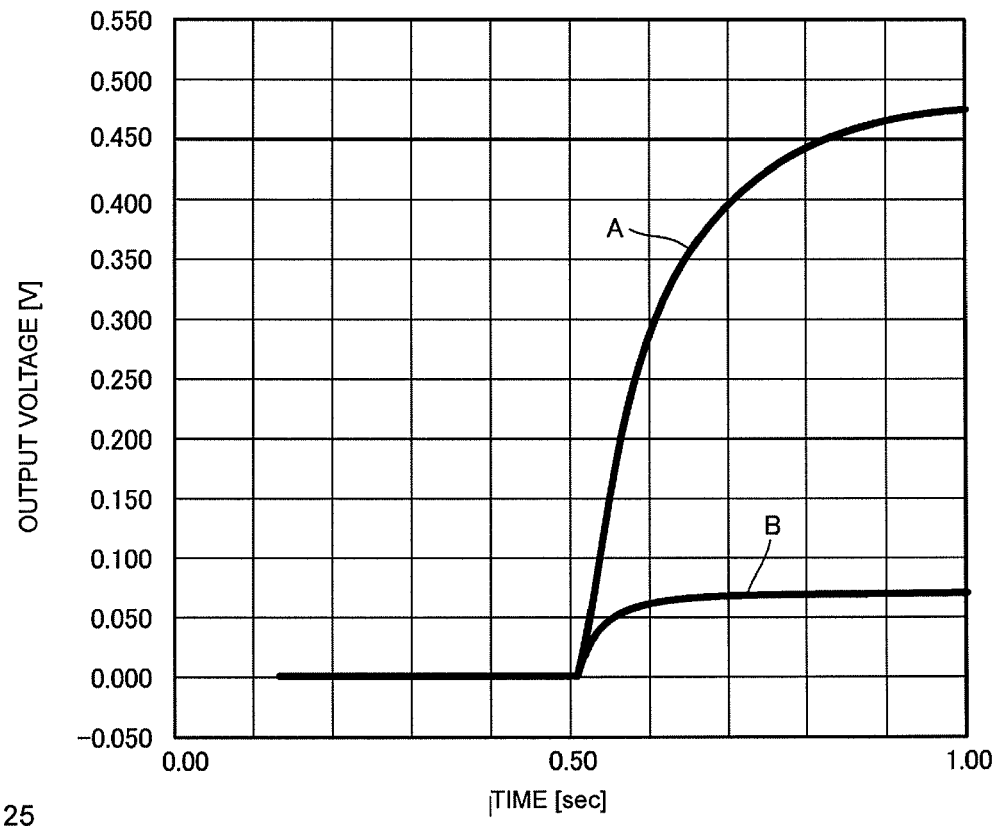
FIG. 24 is a graph showing variations in the voltage detected by two thermal sensors 109 and 110 shown in FIG. 23 at the time of approach of a human body (heat source).

FIG. 24 is a graph showing variations in the voltage detected by the two thermal sensors 109 and 110 shown in FIG. 23 at the time of the approach of a human body (heat source). A curve A is a characteristic of the thermal sensor 109, and a curve B is a characteristic of the thermal sensor 110. The configuration of the thermal sensor circuit is as shown in FIG. 3.

The vertical axis of FIG. 24 is the output voltage of the differential amplifier circuit, and the horizontal axis thereof is the time. In this example, a human body approaches at time 0.5 [sec].

The conditions under which the result of this actual measurement has been obtained are as follows.
Distance L: 10 cm
Temperature of heat source: 40° C.
Temperature of mounting substrate: 28° C.
Amplification factor of differential amplifier circuit: 2000
Applied voltage: 3.0 V
Element size: 2.0×1.2×0.5 mm
Cavity size: 1.6×0.8×0.15 mm Measurements were made under the above-mentioned conditions with no wind. As a result, in the structure having the temperature compensation element integrally disposed therein, the absence of the cavity 5 prevents acquisition of a large output voltage, while the disposition of the cavity 5 allows acquisition of a very large output voltage. Thus, it is understood that high sensitivity is obtained when the thermal sensor including the cavity is used for human body detection.

An example of non-contact thermal sensors, including those for human body detection, will be described with reference to FIGS. 25 and 27.

This thermal sensor includes a temperature compensation element. FIG. 25 is a graph showing variations in the voltage detected by the thermal sensor including a cavity at the times of approach and departure of a heat source.

Figure 25:
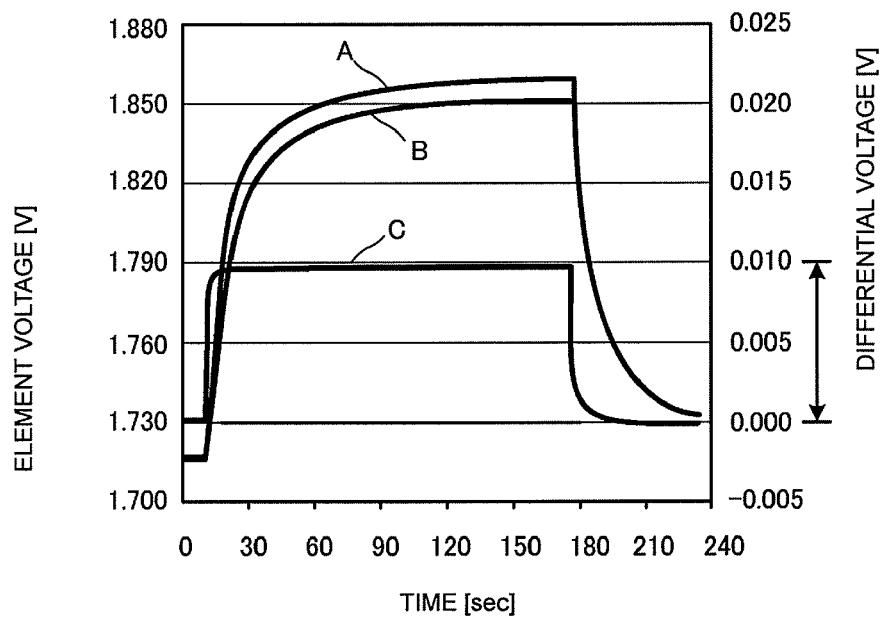
FIG. 25 is a graph showing variations in the voltage detected by a thermal sensor including a cavity at the times of approach and departure of a heat source.

In FIG. 25, a curve A is the voltage across the heat sensing part electrode, a curve B is the voltage across the temperature compensation part electrode, and a curve C is the output voltage of the differential amplifier circuit of the thermal sensor circuit. The configuration of the thermal sensor circuit is as shown in FIG. 3.

In this example, radiation from the heat source is received at time 10 [sec] and is shut off at time 180 [sec].

As shown in FIG. 25, the voltage across the heat sensing part electrode and the voltage across the temperature compensation part electrode are heated upon receipt of radiation from the heat source and gradually stabilized. On the other hand, the rising edge of the differential voltage is steeper than those of the voltage across the heat sensing part electrode and the voltage across the temperature compensation part electrode. That is, upon receipt of radiation from the heat source, the differential voltage becomes a stable voltage. For this reason, a thermal sensor circuit having high responsiveness can be formed by detecting heat on the basis of whether the differential voltage exceeds, for example, a predetermined threshold.

The conditions under which the result of this actual measurement has been obtained are as follows.

Distance L: 3 mm
Temperature of heat source: 60° C.
Temperature of mounting substrate: 28° C.
Amplification factor of differential amplifier circuit: 1
Applied voltage: 3.0 V
Element size: 2.0×1.2×0.5 mm
Cavity size: 1.6×0.8×0.15 mm FIG. 26 is a comparative example of the above-mentioned FIG. 25 and is a graph showing variations in the voltage detected by a thermal sensor including no cavity at the times of approach and departure of a heat source.

Figure 26:
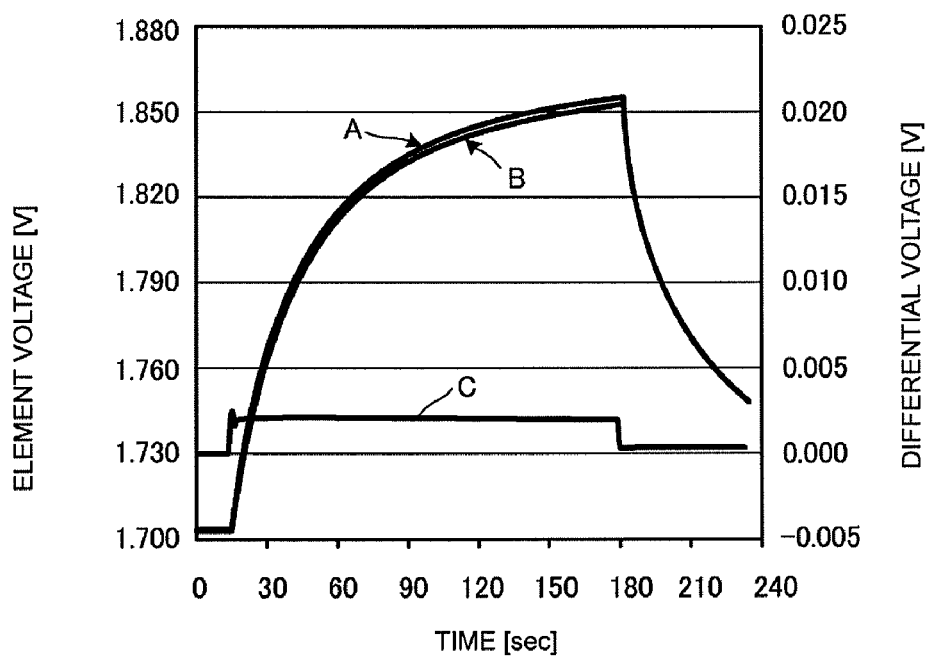
FIG. 26 is a comparative example of FIG. 25 and is a graph showing variations in the voltage detected by a thermal sensor including no cavity at the times of approach and departure of a heat source.

In FIG. 26, a curve A is the voltage across the heat sensing part electrode, a curve B is the voltage across the temperature compensation part electrode, and a curve C is the output voltage of the differential amplifier circuit of the thermal sensor circuit.

As shown in FIG. 26, the voltage across the heat sensing part electrode and the voltage across the temperature compensation part electrode are heated upon receipt of radiation from the heat source and gradually stabilized. However, the two output voltages become similar, reducing the value of the differential voltage.

Figure 27:
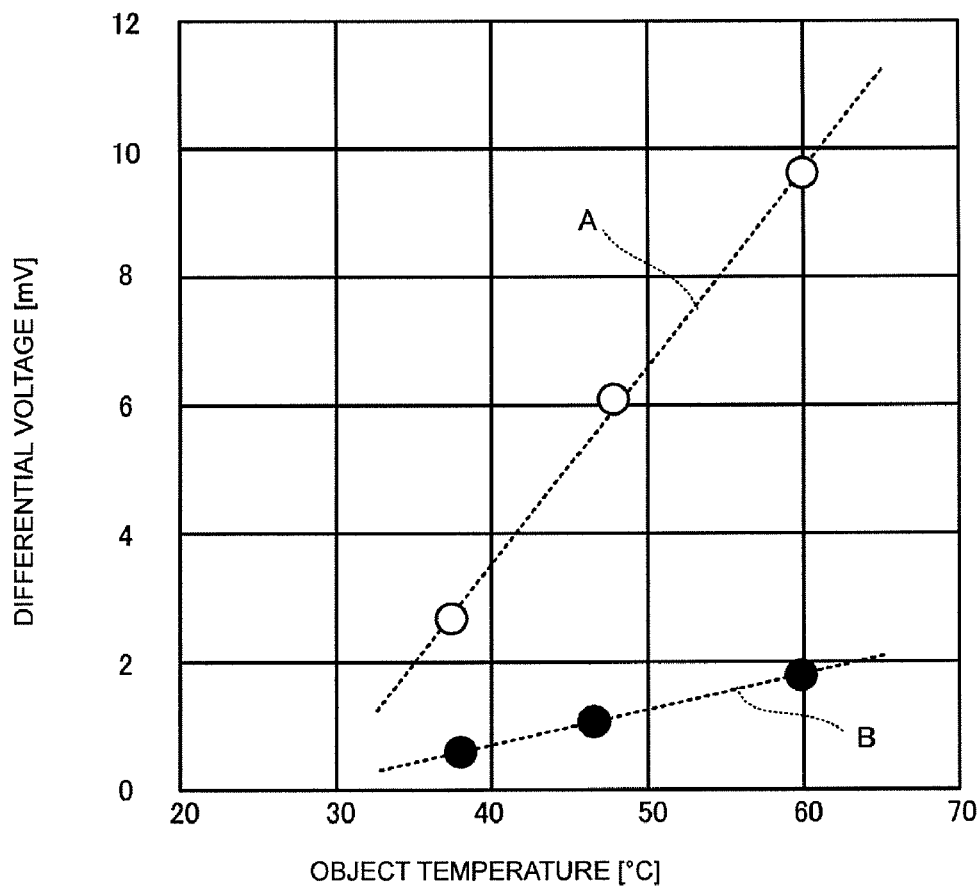
FIG. 27 is a graph showing the relationship of the differential voltage with the temperature of an object to be detected (heat source) with respect to the thermal sensor having the characteristic shown in FIG. 25 (the thermal sensor including a cavity) and the thermal sensor having the characteristic shown in FIG. 26 (the thermal sensor including no cavity).

FIG. 27 is a graph showing the relationship between the subject of heat detection (radiant heat source) and the differential voltage with respect to the thermal sensor having the characteristic shown in FIG. 25 (the thermal sensor including a cavity) and the thermal sensor having the characteristic shown in FIG. 26 (the thermal sensor including no cavity). An approximate straight line A is a characteristic of the thermal sensor including a cavity, and an approximate straight line B is a characteristic of the thermal sensor including no cavity.

As seen, the inclusion of the cavity can increase the detection voltage relative to the object temperature. For this reason, the cavity is also effective in performing detection with a high SN ratio.

The structure of the thermal sensor used for measurement in the fifth embodiment is the same as that shown in FIG. 23(A). The sizes of the parts are as follows.

External sizes of element: 2.0 mm×1.2 mm×0.5 mm
Cavity size: 1.6 mm×0.8 mm×0.15 mm Using this thermal sensor, the thermal sensor circuit shown in FIG. 3(B) was formed.

As comparative thermal sensor structures, two thermal sensors having the structure shown in FIG. 21(A) were prepared. One of the thermal sensors is used for heat detection while keeping the original structure. The other thermal sensor is formed into a structure where an interruption member for interrupting infrared radiation is disposed in the upper part of the side of the thermal sensor on which the heat sensing electrode is formed. That is, the circuit is configured so that the thermal sensor (temperature compensation element) having the interruption member for interrupting infrared radiation disposed above the heat sensing electrode acts as the resistance Rn of the thermal sensor circuit shown in FIG. 3(B) and so that the thermal sensor (thermal sensing element) having no interruption member disposed therein acts as the resistance Rs. Note that the resistance values of the heat sensing element and the temperature compensation element and that of the fixed resistance value Ro at room temperature (25° C.) agree with one another. The resistance values of these elements and that of the element used in FIG. 23(A) at room temperature (25° C.) also agree with one another.

FIG. 28 is a graph showing a characteristic of a thermal sensor including a temperature compensation element and is a graph again showing the characteristic of the thermal sensor shown in FIG. 25.

Figure 28A:
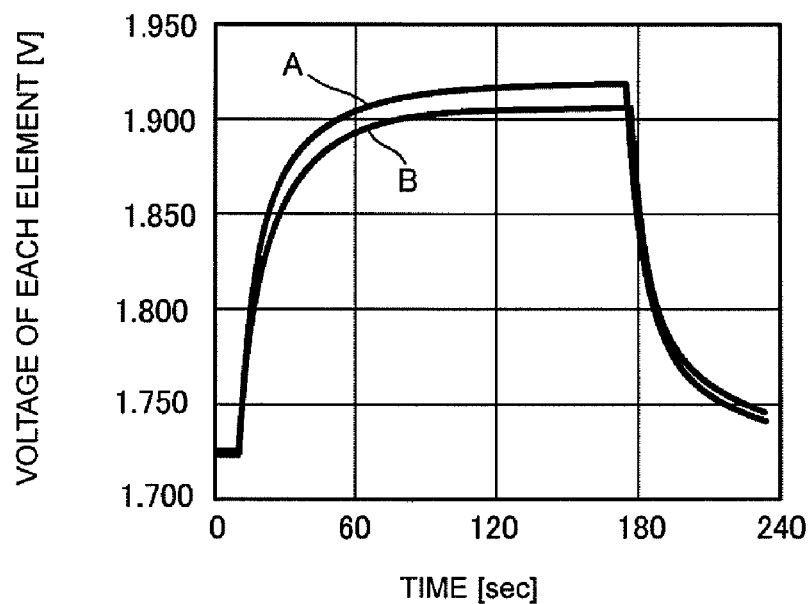
FIG. 28 includes graphs showing a characteristic of a thermal sensor having a temperature compensation element integrally disposed therein and is a graph again showing the characteristic of the thermal sensor shown in FIG. 25.
Figure 28B:
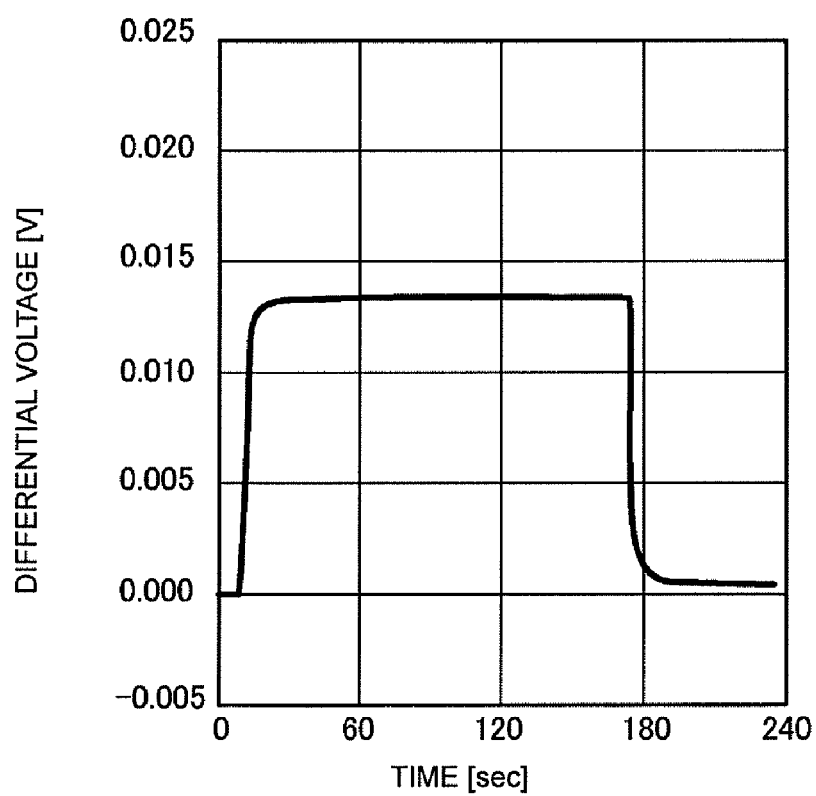

In FIG. 28(A), a curve A is the voltage across the heat sensing part and a curve B is the voltage across the temperature compensation part electrode. FIG. 28(B) is the output voltage of the differential amplifier circuit of the thermal sensor detection circuit.

Figure 29A:
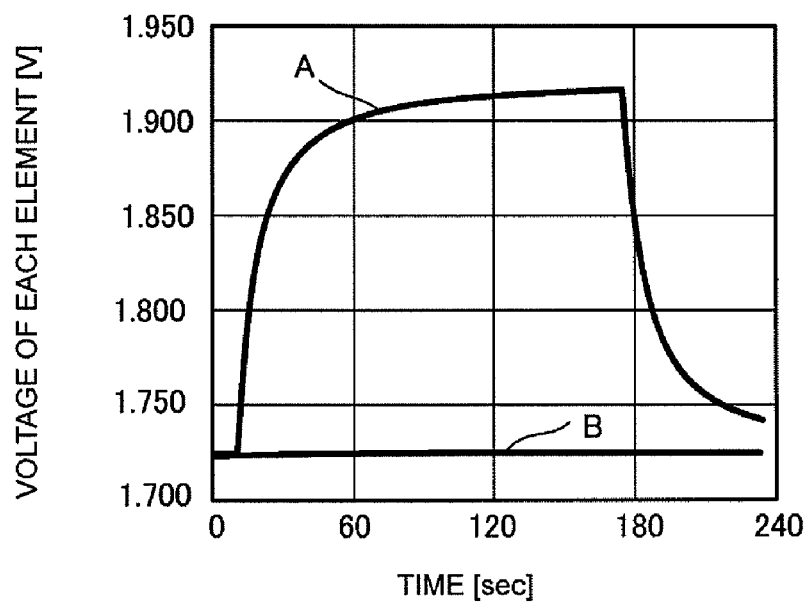
FIG. 29 includes graphs showing a case where the temperature compensation element is prepared as a separate element and mounted on the mounting substrate.
Figure 29B:
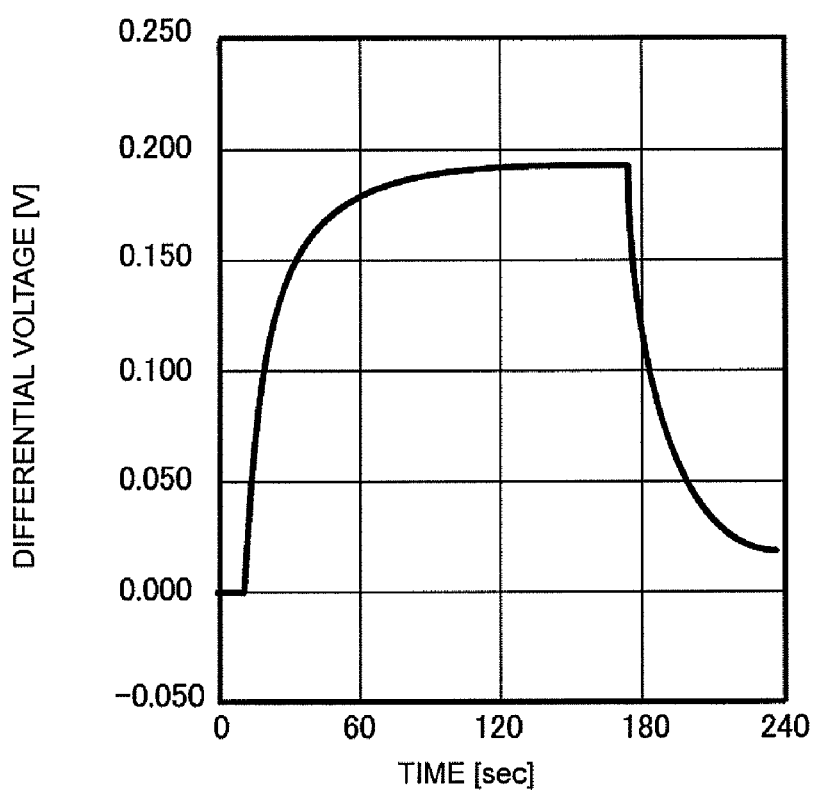

FIG. 29 includes graphs showing a case where the temperature compensation element is prepared using a different element and mounted on the mounting substrate. In FIG. 29(A), a curve A is the voltage across the heat sensing part electrode, and a curve B is the voltage across the temperature compensation element. FIG. 29(B) is the output voltage of the differential amplifier circuit of the thermal sensor detection circuit.

As is apparent from a comparison between FIG. 28(B) and FIG. 29(B), in a comparison between the case where a differential voltage is generated using the thermal sensor where the heat sensing part and the temperature compensation element are disposed integrally and the case where a differential voltage is generated using the thermal sensor where the heat sensing part and the temperature compensation part are disposed separately, it is understood that, in FIG. 28(B), the heat sensing part and the temperature compensation part reach a thermally balanced state earlier, since these parts are formed of the identical ceramic body, allowing a thermal sensor having high responsiveness to be obtained.

Figure 30:
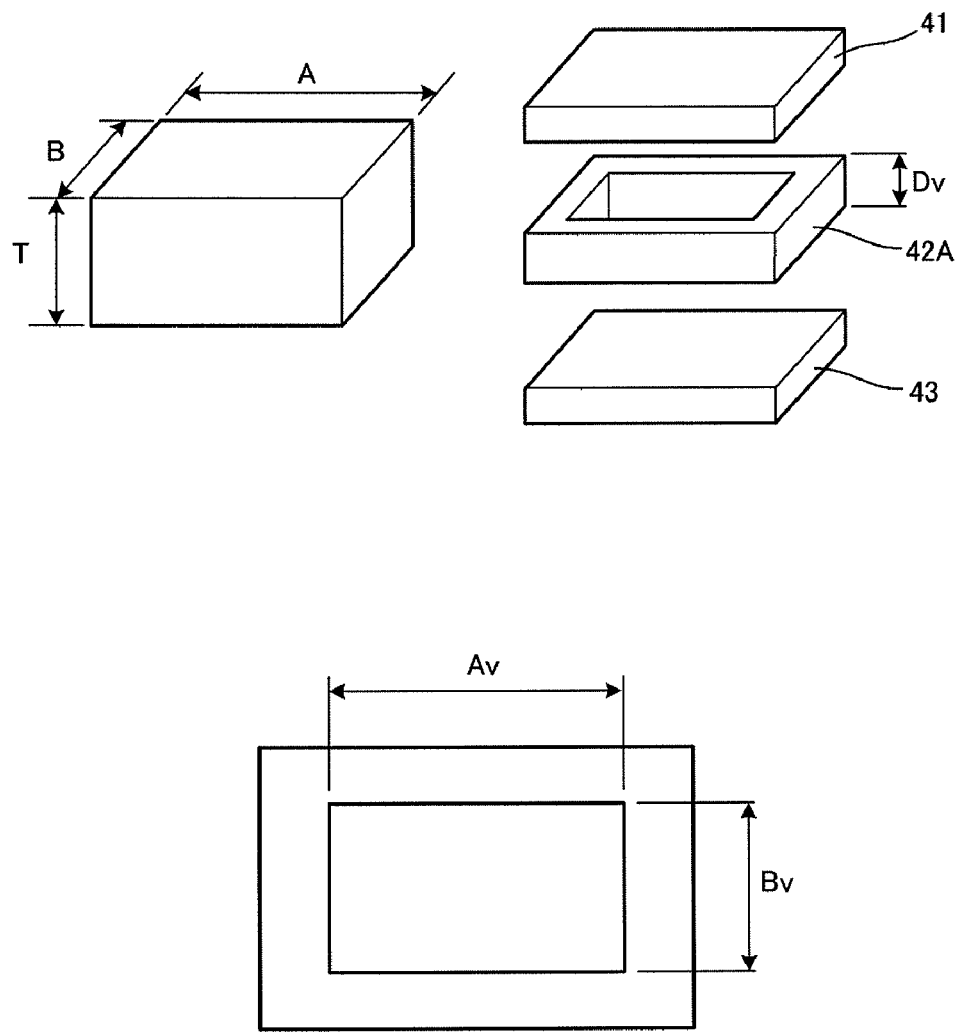
FIG. 30 includes a perspective view and an exploded perspective view of a thermal sensor, and a cross-sectional view of a cavity.
Figure 31:
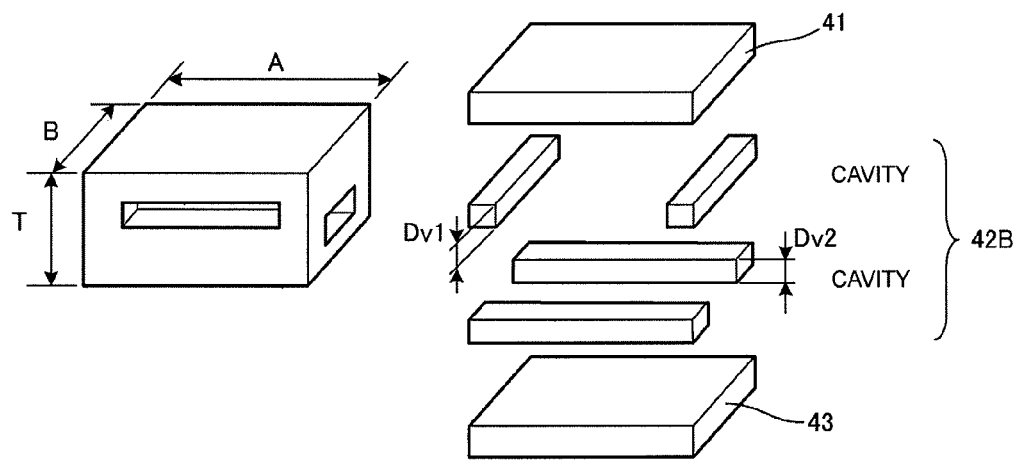
FIG. 31 includes a perspective view and an exploded perspective view of a thermal sensor, and a cross-sectional view of a cavity.
Figure 31:
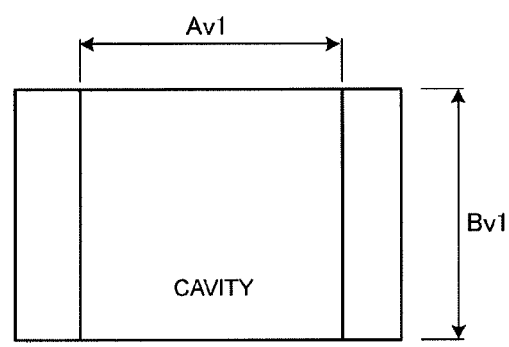
Figure 31:
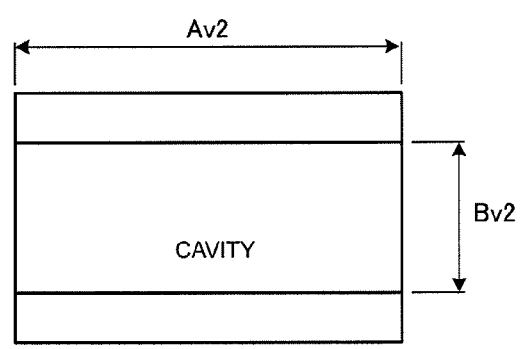
Figure 32:
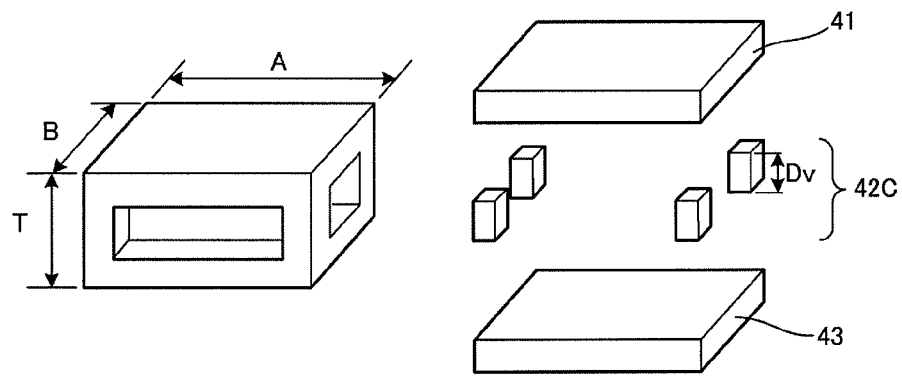
FIG. 32 includes a perspective view and an exploded perspective view of a thermal sensor, and a cross-sectional view of a cavity.
Figure 32:
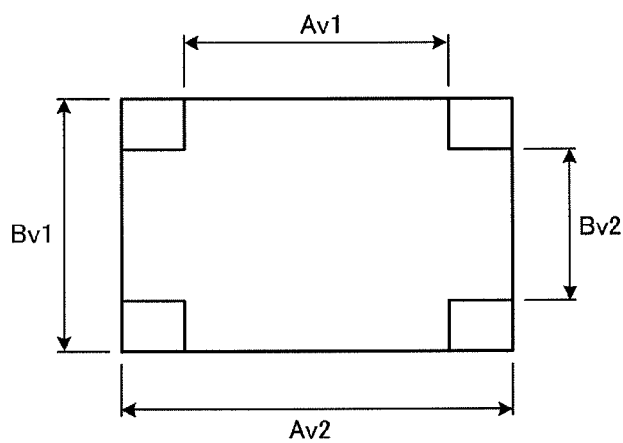

FIGS. 30, 31, and 32 are drawings about different thermal sensors and each show a perspective view, an exploded perspective view, and a cross-sectional view of a cavity. Note that the illustration of electrodes is omitted.

In FIG. 30, a rectangular tube-shaped cavity formation part 42A is disposed between a heat sensing part 41 and a temperature compensation part 43. The sizes of the parts are as follows.

A: 2.0 mm
B: 1.2 mm
T: 0.6 mm
AV: 1.6 mm
BV: 0.8 mm
DV: 0.2 mm

In FIG. 31, a cavity formation part 42B composed of a part extending horizontally and a part extending vertically is disposed between a heat sensing part 41 and a temperature compensation part 43. The sizes of the parts are as follows.

A: 2.0 mm
B: 1.2 mm
T: 0.6 mm
Av1: 1.6 mm
Bv1: 1.2 mm
Dv1: 0.1 mm
Av2: 2.0 mm
Bv2: 0.8 mm
Dv2: 0.1 mm

In FIG. 32, a cavity formation part 42C composed of four columnar portions is disposed between a heat sensing part 41 and a temperature compensation part 43. The sizes of the parts are as follows.

A: 2.0 mm
B: 1.2 mm
T: 0.6 mm
Av1: 1.6 mm
Bv1: 1.2 mm
Av2: 2.0 mm
Bv2: 0.8 mm
Dv: 0.2 mm

In a comparison among the thermal sensors of FIGS. 30, 31, and 32, the heat capacity of the cavity formation part is the largest in the thermal sensor of FIG. 30 and the smallest in the thermal sensor of FIG. 32.

Figure 33:
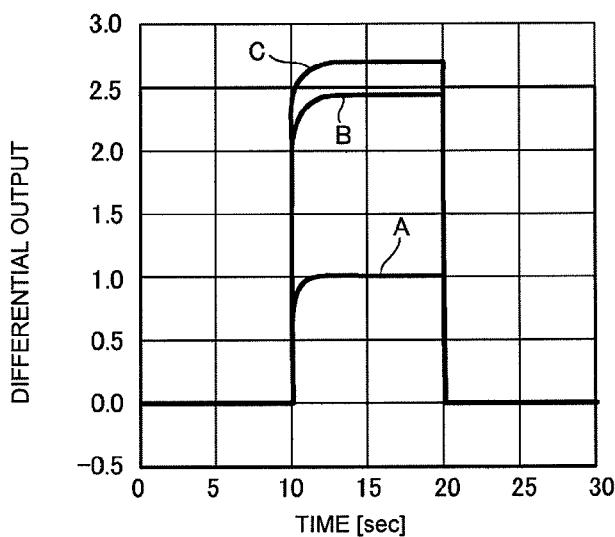
FIG. 33 is a graph showing variations in normalized differential output at the times of approach and departure of a heat source with respect to the thermal sensors of FIGS. 30, 31, and 32.

FIG. 33 is a graph showing variations in normalized differential output between the heat sensing part 41 and the temperature compensation part 43 at the times of approach and departure of a heat source. The measurement circuit is the same as the circuit shown in FIG. 3(B). The measurement system is the same as that shown in FIG. 7. The vertical axis of FIG. 33 is a differential output obtained by normalizing the output voltage (differential voltage) vout measured by the circuit shown in FIG. 3(B) while using the differential output obtained by the structure of FIG. 30 as one. This example is an example where radiation from the object to be measured starts at 10 [sec] and ends at 20 [sec].

In FIG. 33, curves A, B, and C are characteristics of the corresponding thermal sensors of FIGS. 30, 31, and 32. As seen, the differential output increases as the heat capacity of the cavity formation part decreases. Thus, it is understood that sensitivity increases as the heat capacity of the cavity formation part decreases.

A thermal sensor having the structure shown in FIG. 23 is used as a thermal sensor for measurement.

The sizes of the parts are as follows.
Element sizes: 2.0 mm×1.2 mm×0.6 mm
Area of heat sensing part electrode (overlap area between heat sensing part electrodes 1 and 2): 1.5 mm×0.5 mm
Cavity size: 1.6 mm×0.8 mm×0.2 mm Using such a thermal sensor, the relationship between the ratio of the thickness D of the heat sensing part (the distance from the surface of the ceramic body to the cavity) to the thickness T of the body and the differential output was obtained.

Figure 34:
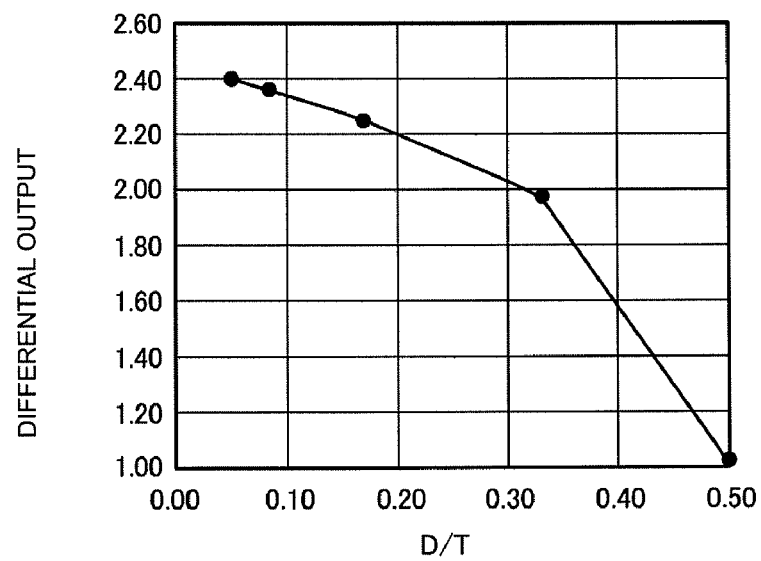
FIG. 34 is a graph where the ratio of the thickness D of the heat sensing part to the thickness T of the ceramic body is used as the horizontal axis and the normalized differential output is used as the vertical axis.

FIG. 34 is a graph where ratio of the thickness D of the heat sensing part to the thickness T of the ceramic body is used as the horizontal axis and the differential output is used as the vertical axis. This vertical axis is normalized using the differential output of a thermal sensor including no cavity. The measurement circuit is the same as the circuit shown in FIG. 3(B). The measurement system is the same as that shown in FIG. 7. It is assumed that the relationship among the resistance values at the start of measurement is Rs=Rn=Ro.

A variation in the thickness D of the heat sensing part relative to the thickness T of the body causes a variation in differential output. As shown in FIG. 34, the differential output increases as the value of D/T decreases. Particularly, a structure where D/T is ⅓ or less has a large output increase effect.

Figure 35:
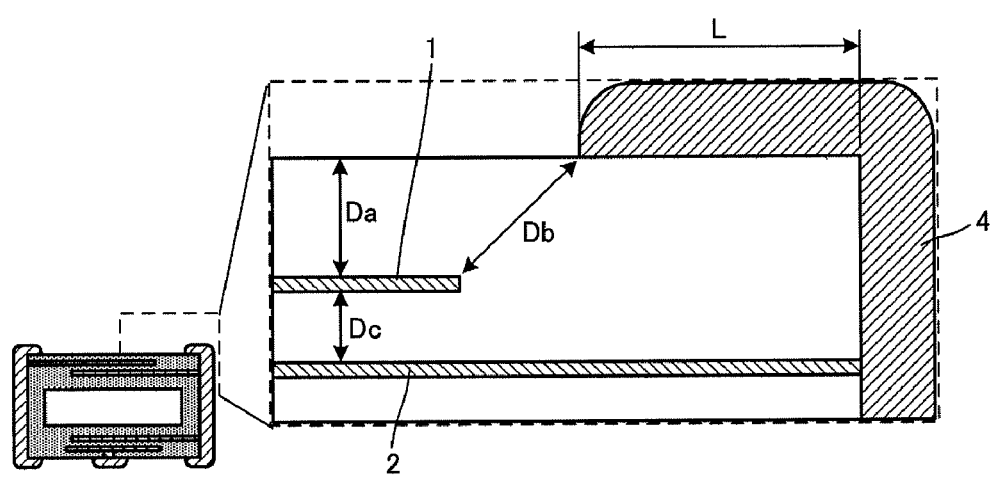
FIG. 35 is a sectional view showing the electrode structure of the heat sensing part of a thermal sensor.

FIG. 35 is a sectional view showing the electrode structure of the heat sensing part of a thermal sensor. The sizes of the parts are as follows.

Figure 36A:
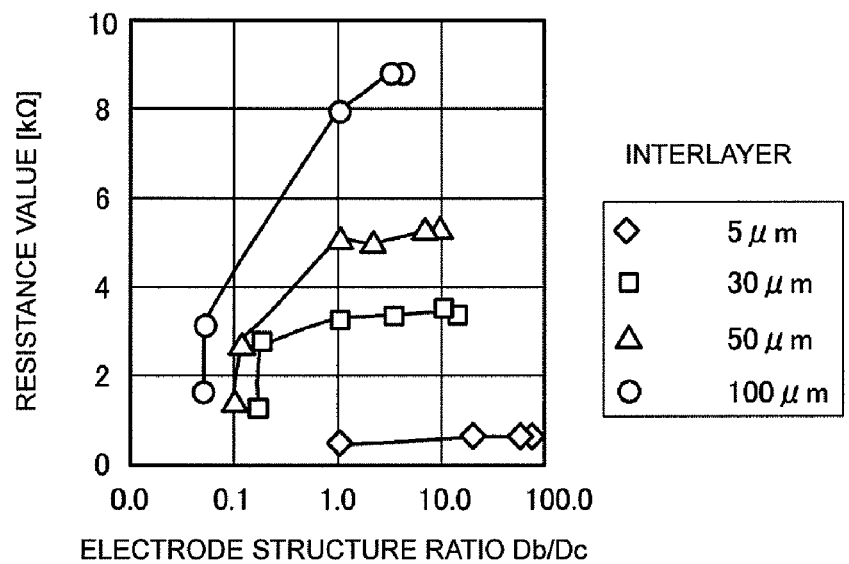
FIG. 36 includes graphs showing variations in element resistance when changing the electrode structure ratio Db/Dc in the case where the distance from the surface of the ceramic body to the heat sensing part electrode 1 is 5 μm and in the case where the distance is 30 μm.
Figure 36B:
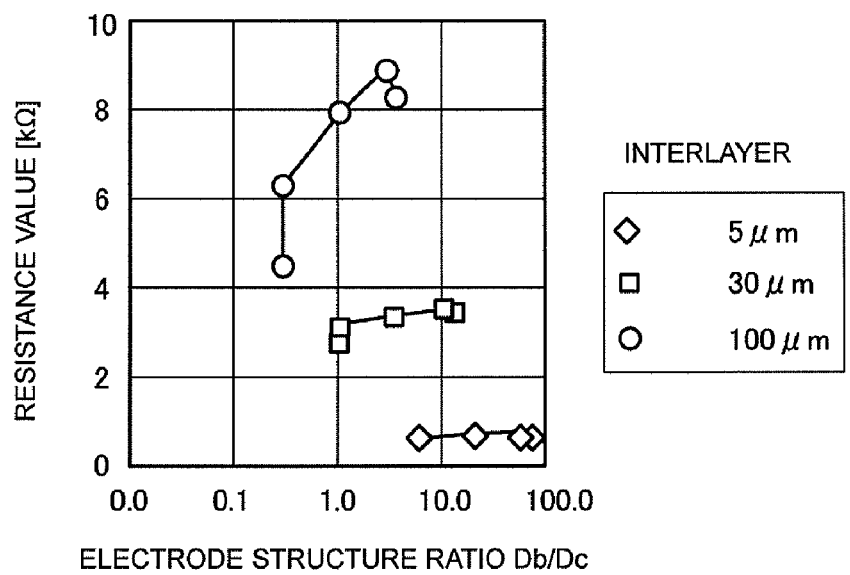

Element sizes: 2.0 mm×1.2 mm×0.6 mm
Area of heat sensing part electrode (overlap area between heat sensing part electrodes 1 and 2): 1.5 mm×0.5 mm Here, the interlayer distance between the heat sensing part electrodes 1 and 2 opposed to each other in the thickness direction is represented by Dc, and the shortest distance between an end portion of the heat sensing part electrode 1 connected to a potential different from that of the external electrode 4 and formed most adjacent to the surface layer within the heat sensing part and an end portion of the external electrode 4 is represented by Db. The electrode structure ratio is represented by Db/Dc. FIGS. 36(A) and 36(B) show variations in element resistance value when changing the electrode structure ratio in the case where the distance from the body surface to the heat sensing part electrode 1 is 5 μm and in the case where the distance is 30 μm. In any case, when the electrode structure ratio is one or below, the resistance value varies to a greater extent, while when the ratio is one or above, the resistance value varies to a lesser extent. For the interlayer distances of 50 μm or less, variations are particularly small.

As shown in the seventh embodiment, thinning of the heat sensing part (the distance from the surface of the ceramic body to the cavity) is effective in increasing the output. However, thinning of the heat sensing part causes the internal electrodes within the sensing part to become close to the surface of the ceramic body. Thus, the resistance characteristics of the heat sensing part are significantly influenced by the above-mentioned distance Db. As a result, variations in the distance Db appear as variations in resistance.

While sensitivity is improved by optimizing the cavity shape to reduce the heat capacity of the heat sensing part, the heat sensing part electrode becomes closer to the body surface as sensitivity is improved. Thus, the influence of variations in the size L of the overlap of the external electrode on the upper surface of the ceramic body increases variations in resistance. For this reason, Db/Dc is set to 1 or more. This results in a relative reduction in the influence of the distance Db, reducing variations in resistance.

Combined with the result of the seventh embodiment, a structure having large outputs and small variations in resistance value is represented by the relationship where the thickness D of the heat sensing part/the thickness T of the body <⅓ and Db/Dc≧1.

While it is sufficient to apply the relationship Db/Dc≧1 to at least the heat sensing part, it is preferred to further apply the relationship to the temperature compensation part, since variations in resistance can be further reduced.

REFERENCE NUMBER LIST 1, 2 heat sensing part electrode
1A, 1B heat sensing part electrode
3, 4 external electrode
5 cavity
6, 7 temperature compensation part electrode
8, 33, 34, 35 external electrode
9 porous part
10 ceramic body
21 mounting substrate
22 object to be detected
23 via electrode
31 operation processing part
41 heat sensing part
42A, 42B, 42C cavity formation part
43 temperature compensation part
101 to 110 thermal sensor

The invention claimed is:

1. A thermal sensor comprising:
   a ceramic body;
   a heat sensing part adjacent to at least a first main surface of the ceramic body and comprising a thermistor material;
   a heat sensing part electrode disposed within the heat sensing part in a location so as to detect a resistance value of the heat sensing part; and
   a heat insulation part within the ceramic body and positioned further from the heat sensing part than the heat sensing part electrode.

2. The thermal sensor according to claim 1, wherein the heat insulation part is a cavity within the ceramic body.

3. The thermal sensor according to claim 2, wherein, in the ceramic body, a porous member surrounds a periphery of the heat insulation part.

4. The thermal sensor according to claim 1, wherein the heat insulation part is composed of a porous member.

5. The thermal sensor according to claim 1, wherein
   the ceramic body comprises a plurality of thermistor layers, and
   the heat sensing part electrodes overlap each other with the thermistor layers therebetween.

6. The thermal sensor according to claim 1, further comprising:
   a temperature compensation part adjacent to a second main surface of the ceramic body and opposite to the heat sensing part with the heat insulation part therebetween, the temperature compensation part comprising a thermistor material; and
   a temperature compensation part electrode disposed within the temperature compensation part so as to detect a resistance value of the temperature compensation part.

7. The thermal sensor according to claim 6, further comprising:
   a first external electrode electrically connected to the heat sensing part electrode; and
   a second external electrode electrically connected to the temperature compensation part electrode, wherein
   the first external electrode and the second external electrode are disposed on outer surfaces of the ceramic body and thermally separated.

8. The thermal sensor according to claim 6, further comprising:
   a first via electrode electrically connected to the heat sensing part electrode; and
   a second via electrode electrically connected to the temperature compensation part electrode, wherein
   the first via electrode and the second via electrode are not connected to each other.

9. The thermal sensor according to claim 1, wherein the heat sensing part electrode includes opposed first and second electrodes, and
   a relationship $D_b/D_c \geq 1$ is established where $D_c$ represents an interlayer distance between the opposed first and second electrodes in a thickness direction of the ceramic body and $D_b$ represents a shortest distance between an end portion of an external electrode and an end portion of one of the opposed first and second electrodes that is most adjacent to the first main surface of the ceramic body and connected to a potential different from the potential of the external electrode.

10. The thermal sensor according to claim 9, wherein a relationship $D/T \leq 1/3$ is established where T represents a thickness of the ceramic body and D represents a thickness of the heat sensing part.

11. A non-contact thermometer comprising:
    the thermal sensor according to claim 1, wherein the heat sensing part is arranged so as to receive radiant heat transfer from an object to be measured.

12. A body detection apparatus comprising:
    the thermal sensor according to claim 1, wherein the heat sensing part is arranged so as to receive radiant heat transfer from a human body.

13. A non-contact thermometer device comprising:
    the thermal sensor according to claim 6 mounted on a mounting substrate; and
    an operation processing part that receives a first value related to heat received or released by the heat sensing part from or to an object to be measured on the basis of a quantity of electricity detected by the heat sensing part electrode and a quantity of electricity detected by the temperature compensation part electrode, and receives a second value related to a temperature of the mounting substrate on the basis of the quantity of electricity detected by the temperature compensation part and calculates a temperature of the object to be measured on the basis of the first value and the second value.

14. A method for non-contact temperature measurement using the thermal sensor according to claim 6 mounted on a mounting substrate, comprising:
    detecting a first amount of heat received or released by the heat sensing part from or to an object to be measured on the basis of a quantity of electricity detected by the heat sensing part electrode and a quantity of electricity detected by the temperature compensation part electrode; and
    detecting a second amount of a temperature of the mounting substrate on the basis of the quantity of electricity detected by the temperature compensation part and detecting a temperature of the object to be measured on the basis of the first amount and the second amount.

* * * * *